US012445471B2

(12) United States Patent
Shahrivar et al.

(10) Patent No.: US 12,445,471 B2
(45) Date of Patent: Oct. 14, 2025

(54) TECHNIQUES OF MONITORING NETWORK TRAFFIC IN A CLOUD COMPUTING ENVIRONMENT

(71) Applicant: Rapid7, Inc., Boston, MA (US)

(72) Inventors: Pojan Shahrivar, Stockholm (SE); Stuart Millar, Bangor (GB)

(73) Assignee: Rapid7, Inc., Boston, MA (US)

(*) Notice: Subject to any disclaimer, the term of this patent is extended or adjusted under 35 U.S.C. 154(b) by 318 days.

(21) Appl. No.: 18/129,809

(22) Filed: Mar. 31, 2023

(65) Prior Publication Data

US 2024/0333737 A1 Oct. 3, 2024

(51) Int. Cl.
*H04L 9/40* (2022.01)

(52) U.S. Cl.
CPC ...... *H04L 63/1425* (2013.01); *H04L 63/1416* (2013.01); *H04L 63/20* (2013.01)

(58) Field of Classification Search
None
See application file for complete search history.

(56) References Cited

U.S. PATENT DOCUMENTS

2019/0182274 A1 6/2019 Doron et al.
2019/0340094 A1* 11/2019 Lu ........................ H04L 63/1441
2020/0036734 A1 1/2020 Radja et al.
2022/0253871 A1 8/2022 Miller et al.
2023/0199006 A1* 6/2023 Gurnov ............... H04L 63/1425 726/23
2024/0007492 A1* 1/2024 Shen ................... H04L 63/1425
2024/0259347 A1* 8/2024 Grover ................ H04L 63/1425
2024/0333768 A1 10/2024 Shahrivar et al.
2025/0007944 A1* 1/2025 Hu .......................... H04L 63/20
2025/0016194 A1 1/2025 P J et al.
2025/0119368 A1* 4/2025 Sharma ............... H04L 43/0876

OTHER PUBLICATIONS

[No Author Listed], Working with Agents. Rapid7 Documentation. https://docs.rapid7.com/tcell/install-an-agent [last accessed Apr. 26, 2023], 2 pages.

(Continued)

*Primary Examiner* — Atta Khan
(74) *Attorney, Agent, or Firm* — Wolf, Greenfield & Sacks, P.C.

(57) ABSTRACT

Machine learning techniques for updating a configuration of a computer network security system operating in a cloud computing environment. The techniques include obtaining a plurality of datasets containing information about a respective plurality of events detected by the computer network security system in the cloud computing environment; generating, using at least one trained ML model, a plurality of signatures representing the plurality of events, the generating comprising processing the plurality of datasets using the at least one trained ML model to obtain the plurality of signatures; clustering the plurality of signatures to obtain signature clusters representing clusters of events in the plurality of events; identifying a particular event cluster from among the clusters of events; and updating the configuration of the computer network security system based on characteristics of events in the identified particular event cluster.

20 Claims, 11 Drawing Sheets

Cloud Computing Environment
101
100
110
Computer Network Security System
Configuration Module
112
Network Traffic Control Module
114
Network Traffic Monitoring Module
116
Event Detection Agent
118-1
Event Detection Agent
118-2
Event Detection Agent
118-M
Software App
102-1
Software App
102-2
Software App
102-N
142
144
140
146
Detected Event Information
122
Configuration Updates
125
Configuration Generation and Recommendation System
120

(56) References Cited

OTHER PUBLICATIONS

Campello et al., Density-Based Clustering Based on Hierarchical Density Estimates. In Advances in Knowledge Discovery and Data Mining (PAKDD) in Lecture Notes in Computer Science. 2013;7819:160-72.
Ester et al., A density-based algorithm for discovering clusters in large spatial databases with noise. Proceedingofthe2ndthe InternationalConferenceon Knowledge Discovery and DataMining. Portland: AAAIPress. 1996;226:31.
Hinton et al., Reducing the Dimensionality of Data with Neural Networks. Science. Jul. 28, 2006;313(5786):504-7.
Shaheed et al., Web Application Firewall Using Machine Learning and Features Engineering. Security and Communication Networks. Jun. 6, 2022:1-14. doi: 10.1155/2022/5280158.

* cited by examiner

Figure 6:
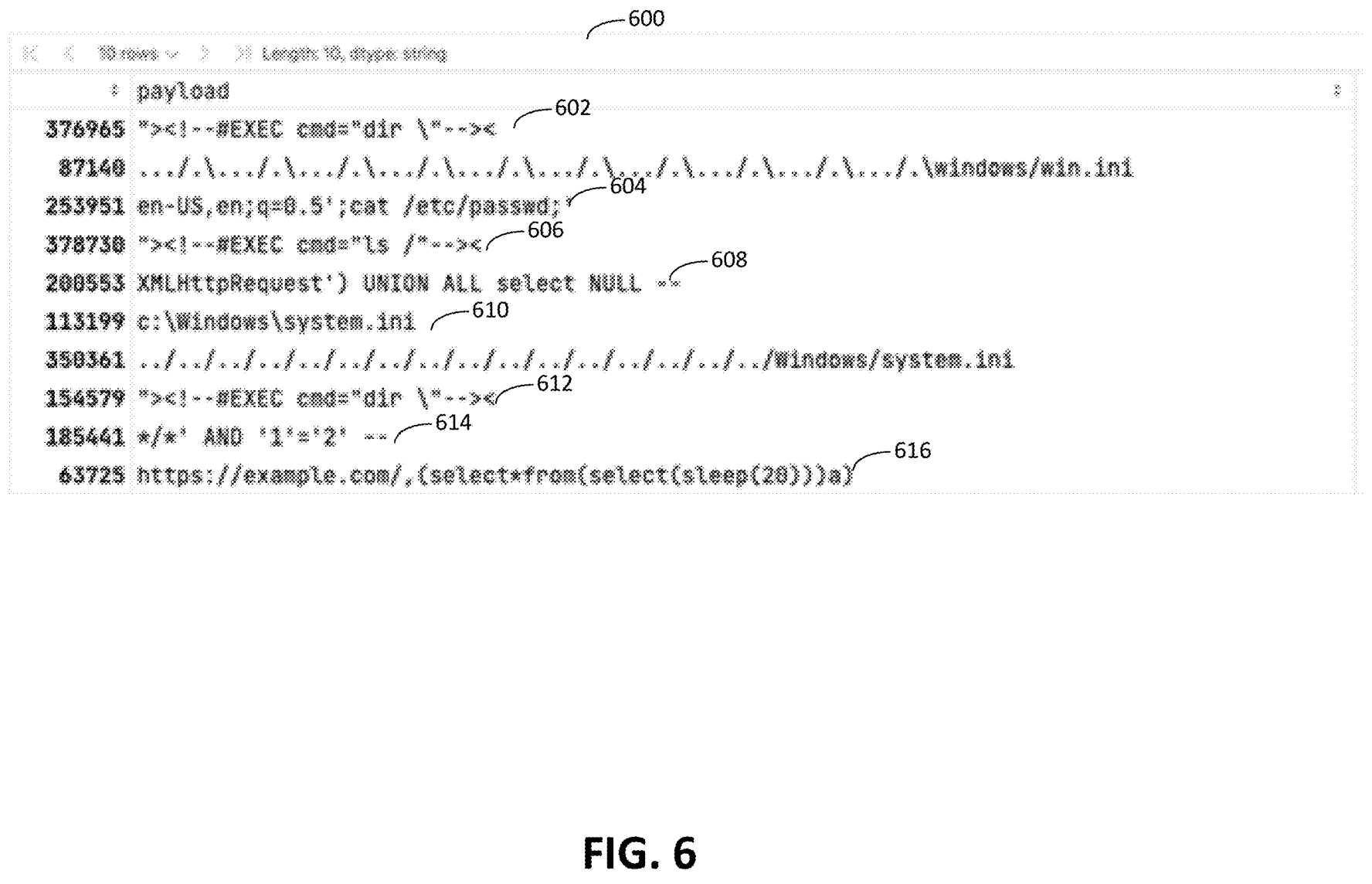

600

10 rows Length: 10, dtype: string

| | payload |
|---|---|
| 376965 | "><!--#EXEC cmd="dir \"-->< |
| 87140 | .../.\.../.\.../.\.../.\.../.\.../.\.../.\.../.\.../.\.../.\windows/win.ini |
| 253951 | en-US,en;q=0.5';cat /etc/passwd;' |
| 378730 | "><!--#EXEC cmd="ls /"-->< |
| 208553 | XMLHttpRequest') UNION ALL select NULL -- |
| 113199 | c:\Windows\system.ini |
| 350361 | ../../../../../../../../../../../../../../../../Windows/system.ini |
| 154579 | "><!--#EXEC cmd="dir \"-->< |
| 185441 | */*' AND '1'='2' -- |
| 63725 | https://example.com/,(select*from(select(sleep(20)))a) |

602 604 606 608 610 612 614 616

FIG. 6 tCell recommends these IPs to filter out, please review visualisation and select YES/NO:

| ip | ip_event_count | percentage_of_all_events |
|---|---|---|
| 52.33.107.0 | 3871 | 44.028662 |
| 54.71.138.87 | 2611 | 29.697452 |
| 54.68.23.116 | 2306 | 26.228389 |

num_events_filtered_out = 8788 = 99.95%

TECHNIQUES OF MONITORING NETWORK TRAFFIC IN A CLOUD COMPUTING ENVIRONMENT

BACKGROUND

Cloud computing enables the delivery of software, data, and other computing resources to remote devices and computing locations. A cloud computing environment may contain many physical and virtual assets which communicate via various computer network protocols. These assets may host various data and software applications. Providing cloud computing security is important to protect the data, software applications, virtual assets, physical assets, and other infrastructure of a cloud computing environment.

Cloud computing security is important to provide in various types of cloud computing environments including private cloud computing environments (e.g., cloud infrastructure operated for one organization), public cloud computing environments (e.g., cloud infrastructure made available for use by others, for example, over the Internet or any other network, e.g., via subscription, to multiple organizations), a hybrid cloud computing environment (a combination of publicly-accessible and private infrastructure) and/or using any other type of cloud computing environment. Non-limiting examples of cloud computing environments include GOOGLE Cloud Platform (GCP), ORACLE Cloud Infrastructure (OCI), AMAZON Web Services (AWS), IBM Cloud, and MICROSOFT Azure.

SUMMARY

Machine learning techniques for updating a configuration of a computer network security system operating in a cloud computing environment. The techniques include obtaining a plurality of datasets containing information about a respective plurality of events detected by the computer network security system in the cloud computing environment; generating, using at least one trained ML model, a plurality of signatures representing the plurality of events, the generating comprising processing the plurality of datasets using the at least one trained ML model to obtain the plurality of signatures; clustering the plurality of signatures to obtain signature clusters representing clusters of events in the plurality of events; identifying a particular event cluster from among the clusters of events; and updating the configuration of the computer network security system based on characteristics of events in the identified particular event cluster.

Some embodiments provide a method for using machine learning (ML) to update a configuration of a computer network security system operating in a cloud computing environment. The method comprises: using at least one computer hardware processor to perform: obtaining a plurality of datasets containing information about a respective plurality of events detected by the computer network security system in the cloud computing environment; generating, using at least one trained ML model, a plurality of signatures representing the plurality of events, the generating comprising processing the plurality of datasets using the at least one trained ML model to obtain the plurality of signatures; clustering the plurality of signatures to obtain signature clusters representing clusters of events in the plurality of events; identifying a particular event cluster from among the clusters of events; and updating the configuration of the computer network security system based on characteristics of events in the identified particular event cluster.

In some embodiments, the computer network security system comprises a firewall. In some embodiments, wherein the firewall comprises a web application firewall (WAF) configured to monitor network traffic from and to one or more software applications executing in the cloud computing environment. In some embodiments, obtaining the plurality of datasets comprises: monitoring the network traffic in the cloud computing environment to detect events; identifying a subset of the detected events as the plurality of events; and generating the plurality of datasets containing information about the plurality of events. In some embodiments, identifying the subset of the detected events comprises identifying events that present a security risk from among the detected events.

In some embodiments, an event in the plurality of events may comprise one or more network communications of: a cross-site scripting (XSS) attack, a cross-site forgery attack, an HTTP redirect attack, an XML external entity (XXE) attack, an account takeover (ATO) attack, a structured query language (SQL) injection attack, an operating system (OS) command injection attack, a file path traversal attack, and/or a local file inclusion (LFI) attack.

In some embodiments, the at least one trained ML model comprises a first trained ML model; the plurality of datasets comprises a first dataset comprising information about a first event in the plurality of events; generating the plurality of signatures comprises generating a first signature for the first event in the plurality of events; and generating the first signature comprises: generating an initial numeric representation of the first dataset; and providing the initial numeric representation as input to the first trained ML model to obtain the first signature, wherein the first signature is a lower-dimensional numeric representation than the initial numeric representation. In some embodiments, generating the initial numeric representation of the first dataset is performed using a character embedding model. In some embodiments, the first trained ML model comprises a first autoencoder.

In some embodiments, the at least one trained ML model comprises different trained ML models for processing datasets corresponding to events of different types, and generating the plurality of signatures comprises: generating initial numeric representations of the datasets corresponding to events of different types, and processing the initial numeric representations using the different trained ML models to obtain the plurality of signatures. In some embodiments, events of different types correspond to network communications of different types of attacks on one or more software applications executing in the cloud computing environment. In some embodiments, the plurality of events comprises a first event corresponding to a first type of attack, and a second event corresponding to a second type of attack different from the first type of attack, the at least one trained ML model comprises a first ML model for processing datasets for events corresponding to the first type of attack, and a second ML model for processing datasets for events corresponding to the second type of attack, and generating the plurality of signatures comprises: generating a first signature corresponding to the first event using the first ML model, and generating a second signature corresponding to the second event using the second ML model.

In some embodiments, the plurality of datasets comprises a first dataset comprising information about the first event and a second dataset comprising information about the second event, wherein generating the first signature comprises: generating a first initial numeric representation of the first dataset using a character embedding model, and providing the first initial numeric representation as input to the first trained ML model to obtain the first signature; and wherein generating the second signature comprises: generating a second initial numeric representation of the second dataset using the character embedding model, and providing the second initial numeric representation as input to the second trained ML model to obtain the second signature. In some embodiments, the first ML model comprises a first autoencoder and the second ML model comprises a second autoencoder different from the first autoencoder.

In some embodiments, clustering the plurality of signatures is performed using a density-based clustering algorithm, a hierarchical clustering algorithm, or k-means clustering. In some embodiments, the clustering is performed using the density-based clustering algorithm, and the density-based clustering algorithm is a density-based spatial clustering of applications with noise (DBSCAN) algorithm or a hierarchical density-based spatial clustering of applications with noise (HDBSCAN) algorithm.

In some embodiments, identifying the particular event cluster comprises: generating a visualization of the clusters of events; displaying the visualization via a graphical user interface (GUI); and receiving, via the GUI, a selection of a particular event cluster. In some embodiments, the GUI is configured to provide information about events in clusters of events to users. In some embodiments, generating the visualization comprises: applying a dimensionality reduction technique to the signature clusters to obtain a two- or-three dimensional representation of the signature clusters; and generating a visualization of the clusters of events by generating a visualization of the two- or three-dimensional representation of the signature clusters.

In some embodiments, identifying the particular event cluster comprises: automatically identifying the particular cluster by applying one or more pre-defined rules to characteristics of events in the clusters of events.

In some embodiments, updating the configuration of the computer network security system, comprises: generating, based on characteristics of events in the identified particular event cluster, one or more rules for processing events detected by the computer network security system in the cloud computing environment; and updating the configuration of the computer network security system with the generated one or more rules.

In some embodiments, the computer network security system comprises a web application firewall (WAF), generating the one or more rules comprises generating one or more rules for use by the WAF while monitoring network traffic to one or more software applications executing in the cloud computing environment, and updating the configuration comprises configuring the WAF to use the generated one or more rules. In some embodiments, the method further comprises using the computer network security system with the updated configuration to monitor network traffic in the cloud computing environment.

In some embodiments, the computer network security system is configured to monitor traffic from and/or to one or more software applications executing in the cloud computing environment. In some embodiments, the one or more software applications comprise one or more application servers and the plurality of events comprises one or more HTTP requests to the one or more application servers. In some embodiments, the one or more software applications comprise one or more web servers and the plurality of events comprises one or more HTTP requests to the one or more web servers.

In some embodiments, the one or more software applications comprise a software application having an application programming interface (API) and wherein the plurality of events comprises one or more API calls to the API of the software application.

In some embodiments, the method further comprises: obtaining a second plurality of datasets containing information about a respective second plurality of events detected by the computer network security system in the cloud computing environment; generating, using the at least one trained ML model, a second plurality of signatures representing the second plurality of events, the generating comprising processing the second plurality of datasets using the at least one trained ML model to obtain the second plurality of signatures; associating at least some signatures of the second plurality of signatures to a signature cluster corresponding to the identified particular event signature cluster; and updating the configuration of the computer network security system to process events corresponding to the at least some signatures using the generated one or more rules.

Some embodiments provide a system for using machine learning (ML) to update a configuration of a computer network security system operating in a cloud computing environment. The system comprises: at least one computer hardware processor; and at least one non-transitory computer-readable storage medium storing processor-executable instructions that, when executed by the at least one computer hardware processor, cause the at least one computer hardware processor to perform: obtaining a plurality of datasets containing information about a respective plurality of events detected by the computer network security system in the cloud computing environment; generating, using at least one trained ML model, a plurality of signatures representing the plurality of events, the generating comprising processing the plurality of datasets using the at least one trained ML model to obtain the plurality of signatures; clustering the plurality of signatures to obtain signature clusters representing clusters of events in the plurality of events; identifying a particular event cluster from among the clusters of events; and updating the configuration of the computer network security system based on characteristics of events in the identified particular event cluster.

Some embodiments provide at least one non-transitory computer-readable storage medium storing processor-executable instructions that, when executed by at least one computer hardware processor, cause the at least one computer hardware processor to perform a method for using machine learning (ML) to update a configuration of a computer network security system operating in a cloud computing environment. The method comprises: obtaining a plurality of datasets containing information about a respective plurality of events detected by the computer network security system in the cloud computing environment; generating, using at least one trained ML model, a plurality of signatures representing the plurality of events, the generating comprising processing the plurality of datasets using the at least one trained ML model to obtain the plurality of signatures; clustering the plurality of signatures to obtain signature clusters representing clusters of events in the plurality of events; identifying a particular event cluster from among the clusters of events; and updating the configuration of the computer network security system based on characteristics of events in the identified particular event cluster.

Some embodiments provide a system for monitoring network traffic in a cloud computing environment. The system comprises: at least a first computing device configured to execute a computer network security system configured to perform: detecting a plurality of events in the cloud computing environment, generating a plurality of datasets containing information about at least some of the detected plurality of events, and providing the plurality of datasets to a configuration generation and recommendation (CGR) system; at least a second computing device configured to execute the CGR system, the CGR system configured to perform: obtaining the plurality of datasets from the computer network security system; generating, using at least one trained ML model, a plurality of signatures representing the plurality of events, the generating comprising processing the plurality of datasets using the at least one trained ML model to obtain the plurality of signatures; clustering the plurality of signatures to obtain signature clusters representing clusters of events in the plurality of events; identifying a particular event cluster from among the clusters of events; and updating the configuration of the computer network security system based on characteristics of events in the identified particular event cluster.

In some embodiments, the computer network security system comprises a network traffic monitoring module comprising a plurality of event detection agents, different event detection agents are configured to detect events of different types, wherein events of different types correspond to network communications of different types of attacks on one or more software applications executing in the cloud computing environment.

In some embodiments, the computer network security system comprises a firewall. In some embodiments, the firewall comprises a web application firewall (WAF) configured to monitor network traffic from and to one or more software applications executing in the cloud computing environment.

In some embodiments, the computer network security system is further configured to perform: identifying the at least some of the detected plurality of events, wherein the identifying comprises identifying events, from among the detected plurality of events, which present a security risk.

In some embodiments, an event in the plurality of events may comprise one or more network communications of: a cross-site scripting (XSS) attack, a cross-site forgery attack, an HTTP redirect attack, a clickjacking attack, an XML external entity (XXE) attack, an account takeover (ATO) attack, a structured query language (SQL) injection attack, an operating system (OS) command injection attack, and/or a local file inclusion (LFI) attack.

In some embodiments, the computer network security system and the CGR system execute in a common cloud computing environment. In some embodiments, the computer network security system and the CGR system execute in different cloud computing environments.

Some embodiments provide a method for monitoring network traffic in a cloud computing environment using a computer network security system, the method comprising: using at least one computer hardware processor to perform: detecting a plurality of events in the cloud computing environment, generating a plurality of datasets containing information about at least some of the detected plurality of events; generating, using at least one trained ML model, a plurality of signatures representing the plurality of events, the generating comprising processing the plurality of datasets using the at least one trained ML model to obtain the plurality of signatures; clustering the plurality of signatures to obtain signature clusters representing clusters of events in the plurality of events; identifying a particular event cluster from among the clusters of events; and updating the configuration of the computer network security system based on characteristics of events in the identified particular event cluster.

In some embodiments, the computer network security system comprises a network traffic monitoring module comprising a plurality of event detection agents, detecting the plurality of events comprises using different event detection agents to detect events of different types, wherein events of different types correspond to network communications of different types of attacks on one or more software applications executing in the cloud computing environment.

In some embodiments, the computer network security system comprises a firewall. In some embodiments, the firewall comprises a web application firewall and the method further comprises: monitoring network traffic from and to one or more software applications executing in the cloud computing environment.

In some embodiments, the method further comprises: identifying the at least some of the detected plurality of events, wherein the identifying comprises identifying events, from among the detected plurality of events, which present a security risk.

In some embodiments, an event in the plurality of events may comprise one or more network communications of: a cross-site scripting (XSS) attack, a cross-site forgery attack, an HTTP redirect attack, a clickjacking attack, an XML external entity (XXE) attack, an account takeover (ATO) attack, a structured query language (SQL) injection attack, an operating system (OS) command injection attack, and/or a local file inclusion (LFI) attack.

In some embodiments, clustering the plurality of signatures is performed using a density-based clustering algorithm, a hierarchical clustering algorithm, or k-means clustering. In some embodiments, the clustering is performed using the density-based clustering algorithm, and the density-based clustering algorithm is a density-based spatial clustering of applications with noise (DBSCAN) algorithm or a hierarchical density-based spatial clustering of applications with noise (HDBSCAN) algorithm.

In some embodiments, updating the configuration of the computer network security system, comprises: generating, based on characteristics of events in the identified particular event cluster, one or more rules for processing events detected by the computer network security system in the cloud computing environment; and updating the configuration of the computer network security system with the generated one or more rules.

In some embodiments, the at least one trained ML model comprises a first trained ML model; the plurality of datasets comprises a first dataset comprising information about a first event in the plurality of events; generating the plurality of signatures comprises generating a first signature for the first event in the plurality of events, and generating the first signature comprises: generating an initial numeric representation of the first dataset; and providing the initial numeric representation as input to the first trained ML model to obtain the first signature, wherein the first signature is a lower-dimensional numeric representation than the initial numeric representation. In some embodiments, generating the initial numeric representation of the first dataset is performed using a character embedding model.

Some embodiments provide at least one computer-readable storage medium storing processor executable instructions that, when executed by at least one computer hardware processor cause the at least one computer hardware processor to perform a method for monitoring network traffic in a cloud computing environment using a computer network security system, the method comprising: detecting a plurality of events in the cloud computing environment, generating a plurality of datasets containing information about at least some of the detected plurality of events; generating, using at least one trained ML model, a plurality of signatures representing the plurality of events, the generating comprising processing the plurality of datasets using the at least one trained ML model to obtain the plurality of signatures; clustering the plurality of signatures to obtain signature clusters representing clusters of events in the plurality of events; identifying a particular event cluster from among the clusters of events; and updating the configuration of the computer network security system based on characteristics of events in the identified particular event cluster.

The foregoing summary is non-limiting.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 6 shows an example dataset containing information about an event detected by a computer network security system in the cloud computing environment.

DETAILED DESCRIPTION

Figure 1A:
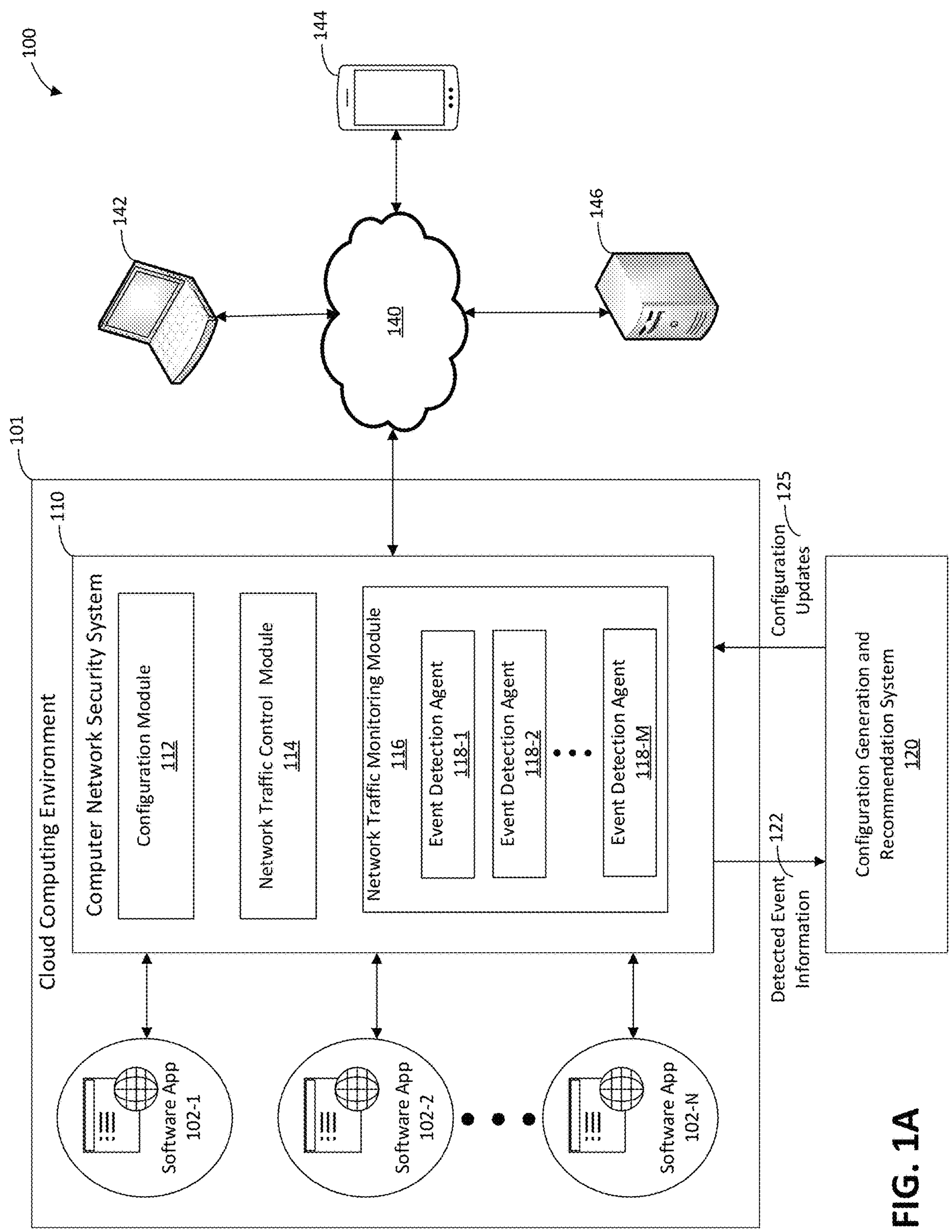
FIG. 1A shows an illustrative environment 100 in which a computer network security system and a configuration generation and recommendation (CGR) system may operate, in accordance with some embodiments of the technology described herein.

As discussed above, it is important to provide security in the context of cloud computing environments to protect the data, software, and infrastructure of such environments. Various types of computer network security systems are used to provide security including cloud access security brokers (CASBs), cloud workload protection platforms (CWPPs), web application firewalls (WAFs), cloud-native security information and event management solutions (SIEMs), intrusion detection systems (IDSs), and/or other types of systems.

One challenge facing conventional computer network security systems, including the above-mentioned systems, is that deploying, configuring, and maintaining such systems is cumbersome, time-consuming, and requires a high level of expertise. For example, a web application firewall (WAF) may perform functions such as monitoring, filtering, and/or blocking traffic (e.g., HTTP traffic) between one or more software applications executing in a cloud computing environment protected by the WAF and the Internet. When properly configured, the WAF can protect cloud-based web applications from various types of threats including cross-site scripting (XSS) attacks, cross-site forgery attacks, structured query language (SQL) injection attacks and/or many other types of attacks. Properly configuring a WAF to protect against such attacks, involves configuring the WAF with rules (sometimes such rules are referred to as "filtering rules") that allow the WAF to tell the difference between benign traffic and traffic that poses a security threat to one or more software applications that the WAF is protecting (e.g., by recognizing a known type of attack or a new type of attack). However, defining such rules and configuring the WAF with them presents numerous challenges.

One major challenge is being able to quickly identify potentially threatening events in the HTTP traffic being monitored. Once such events are identified, WAF rules can be designed to block such communications. However, the very identification of potentially threatening events is challenging and is akin to looking for a needle in a haystack because much of the traffic is benign. In practice, conventional systems identify anomalous or suspicious events only when they can do so with high confidence, otherwise users will need to triage a very large volume of events to identify the ones posing a security risk, which is overwhelming. This is time-consuming and expensive, but also slow—and as a result bad actors may be blocked, but only after they have completed the malicious activity.

Another challenge is that even when threatening events are identified, domain knowledge and technical expertise are required to generate rules to detect such threatening events and to configure the WAF with the generated rules. Indeed, many web application firewalls (e.g., the tCell web application firewall by RAPID7) are very sophisticated and provide a great level of security and flexibility, but require a high level of expertise to be configured.

The inventors have appreciated that users of conventional computer network security systems, such as web application firewalls: (1) face an overwhelming volume of potentially threatening events that need to be triaged; (2) have to devote substantial time and money to triage the events; and (3) have to update the configuration of the computer network security systems (e.g., write new WAF filtering rules) to deal with the identified anomalous or suspicious network traffic, which is difficult especially when the user is a non-expert in the particular computer network security system being updated.

Accordingly, the inventors have developed technology that improves upon conventional computer network security technology (including cloud-computing security technology) by improving upon conventional techniques for deploying, configuring, and maintaining computer network security systems in cloud-computing and/or other types of computing environments.

In particular, the inventors have developed technology for automatically analyzing potentially threatening events detected by a computer network security system (e.g., a WAF) in a cloud computing environment, using machine learning to identify groups of events that may present a security risk, providing an operator with actionable information about such groups, and automatically generating an updated configuration for the computer network security system (e.g., by generating rules for the WAF) in response to user input selecting one or more such groups of events. In turn, the computer network security system may be automatically reconfigured to use the updated configuration (e.g., the WAF may be automatically reconfigured to use new automatically generated rules) going forward. In this way, the technology developed by the inventors reduces, by several orders of magnitude, the amount of time needed to triage potentially threatening detected events, create a remediation, and apply it in practice.

The technology developed by the inventors enables close to zero-configuration deployment of computer network security systems, but at the same time provides a high level of security. Though the technology is broadly applicable to various types of computer network security systems (examples of which are provided herein), in the context of web application firewalls, the technology may be used to effectively process a large volume potentially threatening HTTP requests detected by the WAF to identify groups of similar HTTP requests, provide a summary of such groups of HTTP requests to an operator via a graphical user interface, and based on the operator's selection of one or more such groups, automatically generate and apply WAF filtering rules that the WAF can use to block HTTP requests having similar characteristics to HTTP requests in the selected group(s). As another example, in the context of providing a layer of security for software API calls, the technology may be used to effectively process a large volume of potentially threatening API calls to identify groups of similar API calls, provide a summary of such groups of API calls to an operator via a graphical user interface, and based on the operator's selection of one or more such groups, automatically generate and apply rules that allow a computer network security system to block API calls having similar characteristics to the ones in the selected group(s).

Accordingly, some embodiments provide a method for using machine learning (ML) to update a configuration of a computer network security system (e.g., a firewall such as a WAF) operating in a cloud computing environment. The method includes: (A) obtaining a plurality of datasets containing information about a respective plurality of events (e.g., HTTP requests, API calls) detected by the computer network security system in the cloud computing environment; (B) generating, using at least one trained ML model (e.g., at least one autoencoder), a plurality of signatures representing the plurality of events, the generating comprising processing the plurality of datasets using the at least one trained ML model to obtain the plurality of signatures; (C) clustering the plurality of signatures to obtain signature clusters representing clusters of events in the plurality of events; (D) identifying a particular event cluster from among the clusters of events (e.g., either automatically or based, in part, on user input); and (E) updating the configuration of the computer network security system based on characteristics of events in the identified particular event cluster (e.g., by automatically generating WAF rules based on the identified event cluster and configuring the WAF to operate with the generated rules).

In some embodiments, the computer network security system is configured to monitor network traffic to and/or from one or more software applications executing in the cloud computing environment. Examples of such software applications include one or more application servers (e.g., a server configured to execute Java, .NET, Node.js, Python, Ruby and/or other types of applications responsive to a request), one or more web servers (e.g., Apache, Internet Information Services (IIS), NGINX, Envoy, etc.), one or more cloud delivery networks (e.g., AWS CloudFront), and/or any other software application providing an API that may be invoked/accessed via a network.

In some embodiments, obtaining the plurality of datasets comprises: (1) monitoring the network traffic in the cloud computing environment to detect events (e.g., using one or more event detection agents); (2) identifying a subset of the detected events as the plurality of events; and (3) generating the plurality of datasets containing information about the plurality of events (e.g., with each dataset comprising a string representation of the information a respective event).

In some embodiments, identifying the subset of the detected events comprises identifying events that present a security risk from among the detected events. This may be done in any suitable way and, for example, may be done using rules, thresholds, and/or machine learning techniques, as described herein.

In some embodiments, an event in the plurality of events may comprise one or more network communications (e.g., HTTP requests) part of a cross-site scripting (XSS) attack, a cross-site forgery attack, an HTTP redirect attack, an XML external entity (XXE) attack, an account takeover (ATO) attack, a structured query language (SQL) injection attack, an operating system (OS) command injection attack, a file path traversal attack, and/or a local file inclusion (LFI) attack.

In some embodiments, the at least one trained ML model comprises a first trained ML model (e.g., an autoencoder), the plurality of datasets comprises a first dataset comprising information about a first event in the plurality of events (e.g., a first string containing information about a first HTTP request) and generating the plurality of signatures comprises generating a first signature for the first event in the plurality of events.

In some embodiments, generating the first signature comprises: (1) generating an initial numeric representation of the first dataset (e.g., using character embedding); and (2) providing the initial numeric representation as input to the first trained ML model first to obtain the first signature, where the first signature is a lower-dimensional numeric representation than the initial numeric representation.

In some embodiments, the at least one trained ML model comprises different trained ML models (e.g., different autoencoders) for processing datasets corresponding to events of different types (e.g., HTTP requests part of different types of attacks on software applications in the cloud computing environment), and generating the plurality of signatures comprises: (1) generating initial numeric representations of the datasets corresponding to events of different types (e.g., using the same character embedding model), and (2) processing the initial numeric representations using the different trained ML models (e.g., using different autoencoders) to obtain the plurality of signatures.

In some embodiments, clustering the plurality of signatures is performed using a density-based clustering algorithm (e.g., a density-based spatial clustering of applications with noise (DBSCAN) algorithm or a hierarchical density-based spatial clustering of applications with noise (HDBSCAN) algorithm), Empirical Cumulative Distribution-based Outlier Detection (ECOD), and Copula-Based Outlier Detection (COPOD), cumulative distribution functions (CDFs), a hierarchical clustering algorithm, and/or k-means clustering.

In some embodiments, identifying the particular event cluster comprises: generating a visualization of the clusters of events; displaying the visualization via a graphical user interface (GUI) (see e.g., an example GUI shown in FIG. 5); and receiving, via the GUI, a selection of a particular event cluster (e.g., made by a user). In some embodiments, the GUI is configured to provide information about events in clusters of events to users (e.g., information about HTTP requests such as their originating IP, time of receipt, content, etc.).

In some embodiments, generating the visualization comprises: applying a dimensionality reduction technique (e.g., principal components analysis, independent component analysis, t-nearest neighbor stochastic embedding (tSNE), a further autoencoder, etc.), to the signature clusters to obtain a two- or-three dimensional representation of the signature clusters; and generating a visualization of the clusters of events by generating a visualization of the two- or three-dimensional representation of the signature clusters.

In some embodiments, identifying the particular event cluster comprises automatically identifying the particular cluster by applying one or more pre-defined rules to characteristics of events in the clusters of events. Accordingly, in some cases, the cluster(s) may be identified automatically rather than based on user input provided via a GUI.

In some embodiments, updating the configuration of the computer network security system, comprises: generating, based on characteristics of events in the identified particular event cluster (e.g., common IP addresses from which HTTP requests in the identified clusters originate, other common types of information in the HTTP requests in the identified clusters), one or more rules for processing events detected by the computer network security system in the cloud computing environment; and updating the configuration of the computer network security system (e.g., WAF) with the generated one or more rules (e.g., WAF rules). After the computer network security system with the updated configuration, the security system so updated can be used to monitor network traffic in the cloud computing environment.

Following below are more detailed descriptions of various concepts related to, and embodiments of, the cell type determination systems and methods developed by the inventors. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

FIG. 1A shows an illustrative environment 100 in which a computer network security system 110 and a configuration generation and recommendation (CGR) system 120 may operate, in accordance with some embodiments of the technology described herein. As illustrated in the example embodiment of FIG. 1A, the computer network security system 110 monitors network traffic between devices 142, 144, 146 and software applications 102-1, 102-2, . . . , 102-N to protect the software applications from threats. The computer network security system 110 may be configured to detect threatening events and take action to protect the software applications 102-1, 102-2, . . . , 102-N. The computer network security system 110 may be configured to transmit detected event information 122 to the CGR system 120. The CGR system 120 may be configured to use the detected event information 122 to make configuration updates 125 to the computer network security system 110 to modify monitoring performed by the computer network security system 110.

In some embodiments, an event may be a communication that is determined to be a potential threat to a software application. For example, an event may be an HTTP request that is determined to be a potential threat to a software application. As another example, an event may be an API call that is determined to be a potential threat to a software application.

As illustrated in the example embodiment of FIG. 1A, the computer network security system 110 and the software applications 102-1, 102-2, . . . , 102-N are implemented in a cloud computing environment 101. The cloud computing environment 101 may comprise various computing resources such as networks, computing devices (e.g., servers), storage (e.g., databases), and/or other computing resources. Each of the software applications and the network security system 110 may be implemented using computing resources in the cloud computing environment 101. In some embodiments, a software applications 102-1, 102-2 . . . 102-N and the network security system 110 may each be implemented using cloud computing resources provided by a cloud computing service provider such as GOOGLE CLOUD, AMAZON WEB SERVICES (AWS), MICROSOFT AZURE, and/or another cloud computing service provider.

In some embodiments, the software applications 102-1, 102-2 . . . 102-N may each be executed by a respective set of one or more servers in the cloud computing environment 101. For example, a software application may be executed by application server(s) to provide dynamic content to the devices 142, 144, 146 by executing application code. As another example, a software application may have an application programming interface (API) through which the software application may receive API calls from other devices. As another example, a software application may be a web serve that handles HTTP requests from the devices 142, 144, 146. The web server may provide content (e.g., static HTML and/or CSS pages) in response to HTTP requests.

In some embodiments, an HTTP request may request, from a web server or application server, access to a resource. The HTTP request may include a request line, one or more HTTP headers, and/or an optional message body. The first line of an HTTP request may specify a command (e.g., to send data to the requesting device). Example commands include GET, HEAD, POST, and PUT. The request line may specify a path identifying the resource. An HTTP request may include a command to execute a script and/or an SQL statement for accessing data. The HTTP header(s) may provide additional information about a request. For example HTTP header(s) may indicate an IP address or URL of a server, information about a requesting device (e.g., Internet browser application information and/or OS), a language in which to return content, encoding, connection configuration (e.g., whether to set a timeout for completing the request), and/or other information. The message body may include data that is either being sent or received in the HTTP request. An example HTTP request is described herein with reference to FIG. 6.

In some embodiments, the computer network security system 110 may be implemented using one or more servers in the cloud computing environment 101. For example, the computer network security system 110 may be implemented using one or more servers. The server(s) may be configured to interact with server(s) executing the software applications 102-1, 102-2 . . . 102-N. The computer network security system 110 may monitor network traffic (e.g., HTTP requests) of server(s) executing the software applications 102-1, 102-2 . . . 102-N to provide security against potential threats (e.g., attacks). In some embodiments, the network security system 110 may include one or more agents for each of the software applications 102-1, 102-2 . . . 102-N. The agent(s) deployed for a software application may monitor network traffic to detect threatening events. For example, the agent(s) may monitor network traffic of server(s) executing the software application. In some embodiments, a given agent may be configured to monitor traffic of one or more software applications. For example, the agent may monitor for events of a certain type (e.g., a type of attack) in traffic of multiple software applications. As another example, the agent may monitor events of a certain type for a single application. In some embodiments, the network security system 110 may be scalable based on the number of software applications it is protecting. For example, the number of servers used to implement the computer network security system 110 may be scaled up as the number of applications increases.

As illustrated in the example embodiment of FIG. 1A, the computer network security system 110 includes a configuration module 112, a network traffic control module 114, and a network traffic monitoring module 116.

The configuration module 112 may be used to configure monitoring performed by the computer network security system 110. In some embodiments, the configuration module 112 may be configured to configure the computer network security system 110 with rules that are used in monitoring performed by the computer network security system 110 (e.g., in protecting the software applications 102-1, 102-2 . . . 102-N from threatening events). For example, the configuration module 112 may configure the system 110 with a rule to block traffic (e.g., HTTP requests) to the software application that originates from a particular IP address that is determined to be malicious. The configuration module 112 may configure the system 110 with a rule to: (1) monitor for communications obtained from the IP address; and (2) specify an action (e.g., denying traffic and/or generating a notification for a system administrator) to be performed in response to detecting a communication from the IP address. As another example, the configuration module 112 may configure the system 110 with a rule to filter traffic to/from a software application. The configuration module 112 may encode one or more filtering criteria that allow the computer network security system to identify traffic that presents a security risk from traffic that does not. The one or more criteria may indicate a pattern associated with traffic that presents a security risk to a software application. As another example, the configuration module 112 may configure the system 110 with a rule to block access to certain functionality of the software application. The rule may specify certain requests (e.g., URL paths, file paths, commands, and/or other requests) associated with the functionality. As another example, the configuration module 112 may configure the system 110 with a rule that blocks traffic from a certain geographic region (e.g., a country, a city, or other geographic region).

In some embodiments, the configuration module 112 may be configured to configure the system 110 with a rule to filter out certain traffic from consideration as an event (e.g., a potential attack). In some embodiments, filtered traffic may not be considered by the CGR system 120 in determining configuration updates to the computer network and security system 110. In some embodiments, filtered traffic may not be processed (e.g., by the network traffic control module 114, the network traffic monitoring module 116, and/or an agent of the network traffic monitoring module 116) for detection of an event in the traffic. For example the configuration module 112 may configure the system 110 with a rule to filter out communications to a software application meeting certain criteria, such that the communications are not considered as an event. To illustrate, the configuration module 112 may configure the system 110 with a rule to filter out communications from a particular IP address from being identified as a potential attack because the IP address is known to be associated with an authorized device or user.

In some embodiments, the configuration module 112 may be configured to generate a rule based on user input. For example, the configuration module 112 may provide a graphical user interface (GUI) that allows a user to provide input defining a rule. The configuration module 112 may encode the rule based on the user input (e.g., by defining logic of the rule according to the user input received through the GUI). In some embodiments, the configuration module 112 may be configured to automatically configure the system 110 with new rules. For example, the configuration module 112 may configure the system 110 with a new rule based on configuration updates 125 performed by the CGR system 120. As an illustrative example, the configuration module 112 may automatically configure the system 110 with a rule to block traffic from a particular IP address as part of a configuration update applied to the system 110 by the CGR system 120.

In some embodiments, the configuration module 112 may be configured to associate each of the software applications 102-1, 102-2, . . . , 102-N with a respective set of one or more rules. The computer network security system 110 may be configured to monitor traffic of each software application using its associated set of rule(s). The configuration module 112 may configure the set of rule(s) for one software application differently than the set of rule(s) for another software application. In some embodiments, a rule may be applied using a sensor that recognizes a potential threat. For example, the sensor may identify an anomaly or recognize a pattern that is indicative of a potential threat. The sensor may activate when a potential threat is detected.

In some embodiments, the network traffic control module 114 may be configured to control traffic of the software applications 102-1, 102-2 . . . 102-N. The network traffic control module 114 may be configured to control traffic using rules configured by the configuration module 112. In some embodiments, the network traffic control module 114 may control traffic to/from a given software application using a set of one or more rules associated with the software application (e.g., by the configuration module 112). For example, the network traffic control module 114 may use a set of rule(s) associated with the software application 102-1 to control traffic to/from the software application 102-1. The network traffic control module 114 may use another set of rule(s) associated with the software application 102-2 to control traffic to/from the software application 102-2.

In some embodiments, the network traffic control module 114 may be configured to control traffic to/from a software application by applying rule(s) associated with the software application (e.g., generated by the configuration module 112). The network traffic control module 114 may be configured to analyze traffic to detect threats based on the rules. For example, the network traffic control module 114 may detect whether an HTTP request is from an IP address specified by a rule to block. As another example, the network traffic control module 114 may detect whether text in an HTTP request meets a pattern specified by a rule to be filtered out (e.g., using a sensor of the rule). As another example, the network traffic control module 114 may detect whether an HTTP request is requesting functionality that a rule has blocked for access. The network traffic control module 114 may be configured to further take an action specified by the rule. For example, the network traffic control module 114 may block traffic (e.g., deny access), generate a notification (e.g., in a GUI provided to an administrator of a software application), generate a data record associated with the traffic, and/or perform another action specified by the rule.

In some embodiments, the network traffic control module 114 may be configured to control traffic to/from a software application based on events detected by the network traffic monitoring module 116. The network traffic control module 114 may be configured to: (1) obtain information about an event detected by the network traffic monitoring module 116; and (2) apply one or more rules to the event information. The application of the rule(s) may result in the network traffic control module 114 performing an action (e.g., blocking transmission of a communication, generating a notification for an operator, and/or another action). For example, the network traffic control module 114 may determine that a portion of a communication (e.g., an HTTP request, an API call, or another communication) matches a pattern indicated by the rule as being associated with an SQL injection attack. The network traffic control module 114 may block the communication from reaching a software application according to instructions of the rule.

In some embodiments, the network traffic monitoring module 116 may be configured to monitor traffic to/from software applications. The network traffic monitoring module 116 may monitor traffic to/from a software application by obtaining information about events detected by the network traffic monitoring module 116. An event may be traffic that the network traffic monitoring module 116 determines is potentially threatening to a software application. For example, the event may be an HTTP request or an API call that the network traffic monitoring module 116 determines is a potential threat to a software application. The network traffic monitoring module 116 may be configured to generate datasets containing information about detected events. For example, the network traffic monitoring module 116 may generate, for each event, a dataset that stores information that triggered detection of the event, a timestamp, a request to a software application ("payload"), source address, destination address, and/or other information.

As illustrated in the example embodiment of FIG. 1A, the network traffic monitoring module 116 includes event detection agents 118-1, 118-2 . . . 118-M. In some embodiments, the event detection agents 118-1, 118-2 . . . 118-M may be configured to detect events of different types. The different types of events may comprise different types of attacks on a software application. For example, an event detection agent may be configured to detect an event in which a communication to/from a software application includes a malicious pattern of input to the software application. As another example, an event detection agent may be configured to detect a cross-site scripting (XSS) attack in which a communication to/from a software application may potentially inject code (e.g., a client-side script, HTML code, and/or other code) into a web page for execution by an Internet browser application of another user. As another example, an event detection agent may be configured to detect an XML external entity (XXE) attack in which a communication to/from a software application may include an XML input that modifies a software application's processing of XML data. An XXE attack may allow an attacker to access sensitive data (e.g., user passport information) and/or interact with a back-end of the software application. As another example, an event detection agent may be configured to detect an account takeover (ATO) attack in which a malicious actor may gain access to a user's account by obtaining the user's private data (e.g., a password and/or a session token specific to the user). As another example, an event detection agent may be configured to detect a structured query language (SQL) injection attack in which a communication may include an SQL statement that, when executed by a software application, would allow unauthorized access to data (e.g., user account data, user payment information, and/or other data). As another example, an event detection agent may be configured to detect a cross-site forgery attack in which a communication induces a user to perform an action that the user did not intend to perform. As another example, an event detection agent may be configured to detect an operating system (OS) command injection attack in which a communication to/from a software application may cause the software application to execute OS commands (e.g., on a server executing the software application). The OS commands may compromise the server and/or provide unauthorized access to application data. As another example, an event detection agent may be configured to detect a file path traversal attack in which a communication allows a user unauthorized access to a file and/or directory. As another example, an event detection agent may be configured to detect a local file inclusion (LFI) attack in which a communication causes a software application to run or otherwise expose files (e.g., from a server).

In some embodiments, an event detection agent may be configured to monitor traffic to/from a software application to detect events. The event detection agent may be configured to detect an event by determining whether a communication includes a pattern associated with a threat. The event detection agent may analyze input (e.g., text or bytes) in a communication (e.g., an HTTP request) to determine whether it matches a pattern indicating potential occurrence of the event. A pattern that an event detection agent is configured to detect may also be referred to as a "sensor". For example, the event detection agent may match a regular expression to a field of the input to determine whether the input may potentially be an event. As another example, the event detection agent may be configured to detect an event by determining whether it is associated with a suspicious actor. For example, the event detection agent may identify a source address of a request and determine whether the source address is associated with a suspicious actor. If the source address is associated with a suspicious actor, the event detection agent may detect an event.

It should be appreciated that although an event detection agent may detect an event, the event may not actually be malicious or be an attack on a software application. Detection of an event by an event detection agent indicates a potential security risk. However, it may turn out that a communication which an event detection agent identified as an event is not a security risk to a software application.

In some embodiments, an event detection agent may be configured to identify events for which to send information to the CGR system 120. In some embodiments, the identified events may be a subset of a larger set of events detected by the event detection agent (e.g., over a time period). The event detection agent may be configured to identify a subset of events that the event detection agent determines present a security risk. The event detection agent may be configured to analyze a given event to determine whether it presents a security risk.

In some embodiments, an event detection agent may be configured to identify events for which to send information to the CGR system 120 using event filtering rules. The event detection agent may be configured with one or more event filtering rules that the event detection agent uses to filter out events (e.g., because the events do not have a sufficiently high likelihood of presenting a security risk). For example, the event detection agent may use filter rules added through a GUI through which a user can create, edit, delete, and/or modify event filtering rules. An event filter rule may indicate one or more criteria in which an event is to be filtered out (i.e., such that information for the event is not transmitted to the CGR system 120). For example, the one or more criteria may include an access point identified by a path or route (e.g., a URL path), an IP address, a specific sensor or sensor type, a field name, and/or a field type.

In some embodiments, an event detection agent may be configured to generate a dataset associated with a detected event. A dataset associated with a detected event may include information about the detected event. In some embodiments, the event detection agent may extract information from a communication that triggered detection of an event, and include the information in the dataset. For example, the dataset may include a request to a software application that triggered detection of the event, a source address of the communication, a destination address of the communication, a timestamp of the communication, and/or other information. In some embodiments, payload of a communication may comprise textual data (e.g., specifying instructions for a recipient software application).

In some embodiments, the network traffic monitoring module 116 may include a set of one or more event detection agents for each of the software applications 102-1, 102-2 . . . 102-N. The event detection agent(s) associated with a software application may be configured to detect event(s) in traffic of the software application (e.g., by detecting potential attacks in communications to the software application). In some embodiments, a set of event detection agent(s) for a software application may include multiple event detection agents for detecting different types of events (e.g., different types of attacks). Example event types are described herein.

In some embodiments, the network traffic monitoring module 116 may include different types of event detection agents for different types of servers. For example, the network traffic monitoring module 116 may include one or more agents that monitor traffic to/from an application server executing a software application. As another example, the network traffic monitoring module 116 may include one or more agents that monitor traffic to/from a web server executing a web application. As another example, the network traffic module 116 may include one or more agents that monitor traffic to/from a cloud delivery network.

In some embodiments, the event detection agent(s) associated with a type of server may be configured to interact with a configuration of the server. For example, agent(s) that monitor an application server may support a JAVA, .NET, .NET CORE, NODE.JS, PYTHON, AND/OR RUBY server configuration. As another example, agent(s) that monitor a web server may support an APACHE, Internet Information Services (TTS), NGINX, and/or ENVOY server configuration. As another example, agent(s) that monitor a cloud delivery network may support an Amazon Web Services (AWS) CLOUDFRONT configuration.

As illustrated in the example embodiment of FIG. 1A, the CGR system 120 is configured to obtain detected event information 122 from the network traffic monitoring module 116. In some embodiments, the detected event information 122 may include datasets containing information about events detected by event detection agents. A dataset associated with a detected event may include information about a detected event.

The CGR system 120 may be configured to use detected event information 122 obtained from the computing network security system 110 in order to determine configuration updates 125 to be applied to the computer network security system 110. For example, the CGR system 120 may process datasets associated with detected events to determine the configuration updates 125. In some embodiments, the CGR system 120 may be configured to process the detected event information 122 using a machine learning pipeline to determine the configuration updates 125. The CGR system 120 may be configured to use the machine learning pipeline to: (1) generate signatures representing detected events using detected event information 122; (2) cluster the signatures to obtain signature clusters that represent clusters of events; (3) identify an event cluster from among the event clusters; and (4) determine the configuration updates 125 using the identified event cluster.

In some embodiments, the machine learning pipeline may include one or more machine learning models trained to generate signatures representing detected events. The CGR system 120 may be configured to use the detected event information 122 to generate the signatures. In some embodiments, the signatures representing detected events may be numerical representations of the detected events. For example, a signature may be a vector or matrix of numerical values that represent a detected event. In some embodiments, the CGR system 120 may be configured to process, using the machine learning model(s) a dataset including information about a detected event to generate a signature for the event. The CGR system 120 may be configured to process the dataset by: (1) extracting data from the dataset (e.g., from one or more fields in the dataset); (2) generating input to a machine learning model using the extracted data; and (3) providing the input to the machine learning model to obtain a signature representing the detected event. In some embodiments, the CGR system 120 may be configured to extract input to a software application included in the dataset and generate the input to the machine learning model using the input. For example, the input may comprise of textual information (e.g., an HTTP request or an API call) and the CGR system 120 may use the textual information to generate input to the machine learning model.

In some embodiments, the CGR system 120 may be configured to generate input to a machine learning model using a dataset including information about a detected event by generating an initial numerical representation of data from the dataset. For example, the CGR system 120 may generate an initial numerical representation of an HTTP request. In some embodiments, the CGR system 120 may be configured to generate the initial numerical representation of the data from the dataset using an embedding model. For example, the CGR system 120 may provide characters in the data as input to a character embedding model to obtain an output matrix of numerical values. The output matrix of numerical values may be the initial numerical representation of the data. The CGR system 120 may be configured to use any suitable embedding model to generate the initial numerical representation. For example, embedding model may be a pretrained embedding. Example pretrained embeddings that may be used include the fasText model developed by the Facebook Artificial Intelligence Research (FAIR) lab, the Chars2vec model developed by Google, the Word2vec model developed by Google, the GloVe model developed by Stanford University, and/or another pretrained embedding model. As another example, the embedding model may be an embedding model that was trained using data from datasets generated by event detection agents 118-1, 118-2 . . . 118-M.

In some embodiments, the CGR system 120 may be configured to provide the initial numerical representation of a data corresponding to an event as input to a machine learning model to obtain a signature representing a detected event. For example, the CGR system 120 may provide the initial numerical representation of the dataset as input to a trained neural network model to obtain the signature. In some embodiments, the machine learning model may be an autoencoder. For example, the autoencoder may include a bottleneck trained to generate an output vector of fixed length (e.g., 64 values, 128 values, 256 values, or other suitable number of values which may be a power of two, any value in the range of 8-1024, or any other suitable value) that is the signature representing the event. In some embodiments, the machine learning model may be trained using datasets including information about detected events. For example, the machine learning model may be an autoencoder model that was trained to replicate input initial numerical representations of text from signatures generated by the autoencoder model.

In some embodiments, the CGR system 120 may use different machine learning models to generate signatures of different event types. For example, the CGR system 120 may use different machine learning models for different types of potential attacks that can be detected by the event detection agents 118-1, 118-2 . . . 118-M. In this example, each of the machine learning models may be trained to generate signatures representing detected potential attacks. To illustrate, the CGR system 120 may include a first autoencoder trained to generate signatures representing SQL injection attacks, a second autoencoder trained to generate signatures representing XSS attacks, and a third autoencoder trained to generate signatures representing XXE attacks. The CGR system 120 may be configured to select a machine learning model to use in generating a signature of an event based on the event type. For example, a dataset including information about the event may include an identification of an agent, event type, sensor that detected the event, or other indication of event type. The CGR system 120 may use the information indicating event type to select a machine learning model from among multiple machine learning models to generate a signature representing the event.

In some embodiments, the CGR system 120 may be configured to cluster signatures representing events. The CGR system 120 may be configured to apply a clustering algorithm to signatures representing the events to obtain signature clusters. Each of the signature clusters may represent an event cluster. In some embodiments, the CGR system 120 may be configured to perform clustering using a density-based clustering algorithm. In some embodiments, the density-based clustering algorithm may be a density-based clustering of applications with noise (DBSCAN). For example, the CGR system 120 may use the DBSCAN clustering algorithm described in "A density-based algorithm for discovering clusters in large spatial databases with noise" published in Proceedings of the Second International Conference on Knowledge Discovery and Data Mining (KDD'96) by AAAI Press, pp 226-231 in 1996, and which is incorporated by reference herein. In some embodiments, the density-based clustering algorithm may be a hierarchical density-based spatial clustering (HDBSCAN) algorithm. For example, the CGR system 120 may use the HDBSCAN algorithm described in "Density-Based Clustering Based on Hierarchical Density Estimates", published in Advances in Knowledge Discovery and Data Mining (PAKDD 2013) in Lecture Notes in Computer Science, vol 7819 by Springer, Berlin, Heidelberg in 2013, which is incorporated by reference herein. In some embodiments, the CGR system 120 may be configured to performing clustering using a k-means clustering algorithm, a Gaussian Mixture Model algorithm, a balance iterative reducing and clustering (BIRCH) algorithm, an affinity propagation clustering algorithm, a mean-shift clustering algorithm, an ordering points to identify the clustering structure (OPTICS) algorithm, an agglomerative hierarchy clustering algorithm, or another suitable clustering algorithm.

In some embodiments, the CGR system 120 may be configured to identify an event cluster from among multiple event clusters obtained from clustering signatures representing events. In some embodiments, the CGR system 120 may be configured to automatically identify the event cluster from among the multiple event clusters. The CGR system 120 may automatically identify the event cluster by applying one or more pre-defined rules to characteristics of events in a cluster. For example, the CGR system 120 may apply pre-defined rule(s) to identify an event cluster with events that present the greatest security risk to a software application. As another example, the CGR system 120 may apply pre-defined rule(s) to determine a value indicating a risk level associated with events in the cluster (e.g., using values from datasets associated with events in the event cluster). The CGR system 120 may determine a cluster that exceeds a threshold risk value to be the identified event cluster.

In some embodiments, the CGR system 120 may be configured to identify an event cluster from among multiple event clusters by obtaining user input indicating the event cluster. The CGR system 120 may be configured to: (1) generate a visualization of the event clusters; (2) display the visualization in a GUI; and (3) receive, through the GUI, a selection of the event cluster.

In some embodiments, the CGR system 120 may be configured to generate a visualization of the event clusters by applying a dimensionality reduction technique to the event clusters to obtain a lower dimensional representation of the event clusters. For example, the CGR system 120 may apply dimensionality reduction to obtain a 2D or 3D representation of signatures in an event cluster. Any suitable dimensionality reduction technique may be used. For example, the CGR system 120 may use principal component analysis (PCA), factor analysis (FA), linear discriminant analysis (LDA), truncated singular value decomposition (SVD), kernel PCA, multidimensional scaling (MDS), isometric mapping, independent component analysis (ICA), or another dimensionality reduction technique. As another example, the CGR system 120 may use t-nearest neighbor stochastic embedding (t-SNE). As another example, the CGR system 120 may use non-negative matrix factorization (NMF) if signatures are non-negative. As another example, another autoencoder with a two or three dimensional encoding may be used to encode signatures in an event cluster. The CGR system 120 may generate a visualization of the reduced dimension representations of the event clusters. For example, the CGR system 120 may generate a graphical interface (e.g., including a 2D or 3D graph) with points in a graph representing respective event clusters.

In some embodiments, the CGR system 120 may be configured to provide information about event clusters through a GUI. The CGR system 120 may be configured to provide information about events in an event cluster when a user selects a visualization of the event cluster in a GUI (e.g., a point in a graph). In some embodiments, the CGR system 120 may be configured to determine aggregated statistics describing events in the event cluster. For example, the CGR system 120 may display, in a GUI, an indication of number of distinct payloads in the event cluster, number of distinct IP addresses in the event cluster, event detection agents for events, numbers of different types of events in the event cluster, indication of times in which events in the cluster were detected. In some embodiments, the CGR system 120 may be configured to allow a user to select a subset of events and/or datasets associated with the events in the GUI. For example, the CGR system 120 may allow a user to select a subset of events that share a characteristic (e.g., source IP address, patterns of input, event type, event time ranges, event detection agent that detected the event, and/or other characteristic(s)).

In some embodiments, the CGR system 120 may be configured to make configuration updates 125 to the computer network security system 110 based on an identified event cluster. The CGR system 120 may be configured to update the configuration of the computer network security system 110 by configuring the computer network security system 110 to protect one or more software applications from traffic that is similar to events in the identified event cluster. For example, the CGR system 120 may be configured to update the configuration of the computer network security system 110 such that it blocks traffic that has one or more characteristics of events in the identified event cluster. In some embodiments, the CGR system 120 may be configured to update a configuration of the computer network security system 110 by generating a rule based on a characteristic shared by at least some of the events in an identified event cluster. For example, the CGR system 120 may generate a rule to block traffic from an IP address shared among the events, generate a rule to block traffic that includes an input pattern shared by the events, or generate a rule to generate a notification for traffic that has an IP address and/or input pattern shred among the events. The rule(s) may be used by the network traffic control module 114 to control traffic to/from software application(s).

In some embodiments, the CGR system 120 may be configured to make the configuration updates 125 by transmitting configuration information to the configuration module 112. The configuration information may be used by the configuration module 112 to generate one or more rules that are then applied to traffic by the network traffic control module 114. In some embodiments, the CGR system 120 may be configured to make the updates 125 by generating rule(s) and transmitting the rule(s) to the configuration module 112. The configuration module 112 may update an existing set of rules to include the rule(s) provided by the CGR system 120. The network traffic control module 114 may be configured to use the updated set of rules in controlling traffic to/from software applications.

In some embodiments, the communication network 140 may be a wide area network (WAN). For example, the WAN may be the Internet. In some embodiments, the communication network 140 may be local area network (LAN), a storage area network (SAN), an enterprise private network (EPN), or other type of network. Devices 142, 144, 146 may communicate with computing devices (e.g., servers) executing the software applications 102-1, 102-2 . . . 102-N through the communication network 140. The computer network security system 110 may monitor and control traffic being exchanged through the communication network 140 between the devices 142, 144, 146 and the software applications.

As illustrated in the example embodiment of FIG. 1A, the devices 142, 144, 146 that communicate with the software applications 102-1, 102-2 . . . 102-N may include various computing devices. For example, the computing devices may include mobile devices (e.g., smartphones, tablets, laptops, wearable devices, and/or other mobile devices), desktop computers, laptop computers, servers, and/or other devices.

Figure 1B:
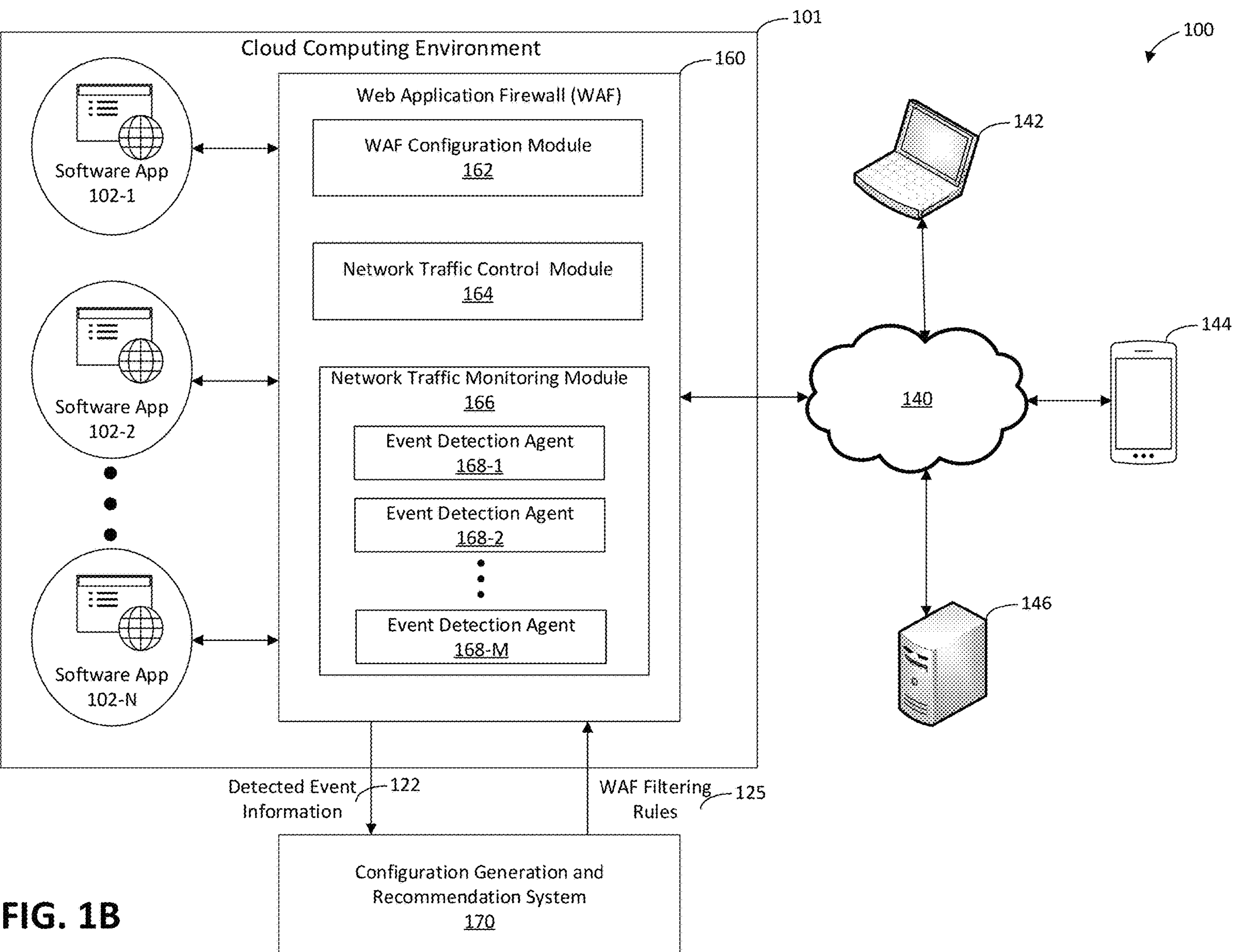
FIG. 1B shows an example of illustrative environment 100 in which the computer network security system is a web application firewall (WAF) software application, in accordance with some embodiments of the technology described herein.

FIG. 1B shows an example of illustrative environment 100 in which the computer network security system 110 is a web application firewall (WAF) 160, in accordance with some embodiments of the technology described herein. In such embodiments, the software applications 102-1, 102-2 . . . 102-N may include web applications that the WAF 160 provides protection for. The WAF 160 may be configured to monitor and control traffic to/from the web applications to protect the web applications from attacks (e.g., site forgery, XSS, file inclusion, SQL injection, and/or other attacks). The WAF 160 may be deployed as a virtual shield between the web applications and the communication network 140 (e.g., the Internet). Accordingly, communications from devices may be processed by the WAF 160 before being able to reach destination web applications.

In some embodiments, the WAF 160 may be a cloud-based WAF that is implemented in the cloud computing environment 101. Traffic that is intended for web applications that the WAF 160 is configured to protect may be routed through the WAF 160. For example, communications from devices 142, 144, 146 to web applications that the WAF 160 is configured to protect may be routed to one or more servers on which the WAF 160 is implemented. In some embodiments, cloud-based WAF may be updated during operation. For example, the CGR system 170 may configure WAF filtering rules 125 during operation of the WAF 160.

As illustrated in the example embodiment of FIG. 1B, the WAF 160 includes a WAV configuration module 162, a network traffic control module 164, and a network traffic monitoring module 166.

The WAF configuration module 162 may be configured to manage configuration of monitoring performed by the WAF 160. The WAF configuration module 162 may configure the WAV 160 with rule(s) that are used in monitoring traffic to/from web applications. For example, the WAF configuration module 162 may generate a rule for a software application to block certain HTTP requests to the web applications from a particular IP address that is determined to be malicious. The WAF configuration module 162 may configure the WAF 160 with a rule to: (1) monitor for communications obtained from the IP address; and (2) specify an action (e.g., denying traffic, reporting) to be performed in response to detecting an HTTP request from the IP address. As another example, the WAF configuration module 162 may configure the WAF 160 with a rule to filter traffic to/from a software application. The WAF configuration module 162 may encode one or more filtering criteria that allow the computer network security system to identify traffic that poses a threat from traffic that does not. The one or more criteria may indicate a pattern associated with traffic that poses a threat to a software application. As another example, the WAF configuration module 162 may configure the WAF 160 with a rule to block access to certain functionality of the software application. The rule may specify certain URL paths associated with the functionality that is to be blocked from access. As another example, the WAF configuration module 162 may configure the WAF 160 with a rule that blocks HTTP requests from a certain geographic region (e.g., a country, a city, or other geographic region).

In some embodiments, the WAF configuration module 162 may be configured to define a rule based on user input. For example, the WAF configuration module 162 may provide a graphical user interface (GUI) that allows a user to provide input defining a rule. The WAF configuration module 162 may encode the rule based on the user input (e.g., by defining logic of the rule according to the user input received through the GUI). In some embodiments, the WAF configuration module 162 may be configured to automatically generate a rule. For example, the WAF configuration module 162 may generate a rule based on configuration updates 125 obtained from the CGR system 170. As another example, the WAF configuration module 162 may add a rule generated by the CGR system 170.

In some embodiments, the WAF configuration module 162 may be configured to associate a web application with a set of one or more rules. The WAF 160 may be configured to monitor traffic for the web application using the associated rule(s). The WAF 160 may configure a set of rule(s) for one web application different from a set of rule(s) for another web application.

In some embodiments, the network traffic control module 164 may be configured to monitor traffic to/from web applications according to a configuration of the WAF configuration module 162. The network traffic control module 164 may be configured to monitor communications by applying rules generated by the WAF configuration module 162. For example, the network traffic control module 164 may control access of HTTP requests to web applications. The network traffic control module 164 may apply rule(s) to the HTTP requests to determine whether to allow the requests to destination web applications. The network traffic control module 164 may be configured to perform various actions to control traffic to/from web applications. For example, the traffic control module 164 may block HTTP requests, generate notifications, and/or perform other actions.

In some embodiments, the network traffic monitoring module 166 may be configured to monitor traffic to/from web applications by detecting events (e.g., potential threats to the web applications). As described herein with reference to the network traffic monitoring module 116 in FIG. 1B, the network traffic monitoring module may include event detection agents 168-1, 168-2 . . . 168-M that process traffic to/from detect events. For example, the event detection agents 168-1, 168-2 . . . 168-M may process HTTP requests to determine whether the HTTP requests are events (e.g., potential attacks).

In some embodiments, each of the event detection agents 168-1, 168-2 . . . 168-M may each be associated with a web application for which it performs monitoring. The event detection agent may detect events for the web application (e.g., by identifying potential threats to the web application in communications sent to the web application). The event detection agent may be configured to generate datasets including information about detected events (e.g., for transmission as detected event information 122 to the CGR system 170).

In some embodiments, the CGR system 170 may be configured to use detected event information 122 to generate WAF filtering rules 125 that may be used by the WAF 160 in monitoring of traffic to/from web applications. The CGR system 170 may be configured to perform functionality described in reference to the CGR system 120 of FIG. 1A. For example, the CGR system 170 may process detected event information 122 using a machine learning pipeline that generates event clusters. The CGR system 170 may then identify an event cluster (e.g., automatically or based on user input) and generate a WAF rule based on a characteristic of events in the identified event cluster. The CGR system 170 may transmit the WAF rules 125 to the WAF 160 for use in monitoring traffic to/from web applications.

Although example embodiments described herein mention a WAF 160 as an example of a computer network and security system 110, some embodiments may implement techniques described herein in other types of computer network and security systems 110. For example, the computer network and security system 110 may be a cloud access security broker (CASB), a cloud workload protection platform (CWPP), a cloud-native security information and event management solution (SIEM), an intrusion detection system (IDS), and/or another type of computer network and security system.

Figure 1C:
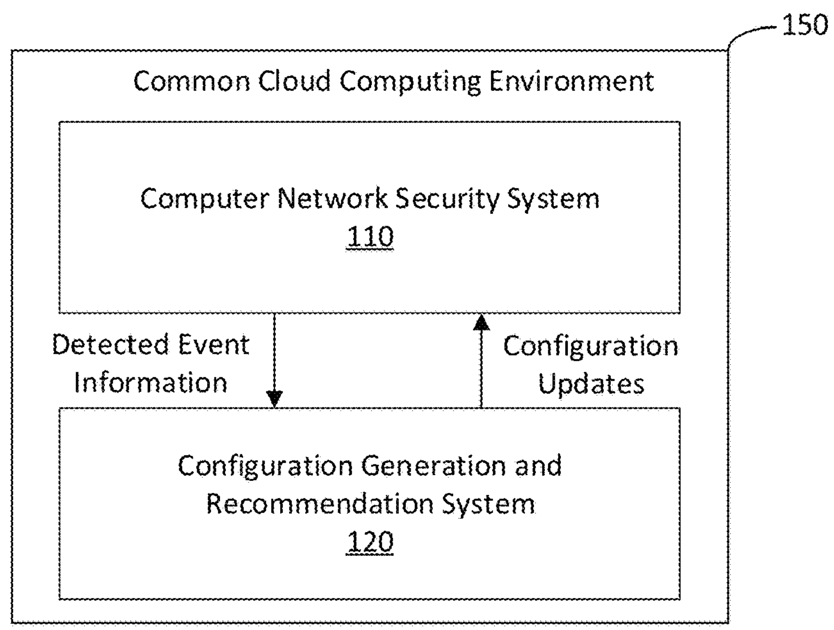
FIG. 1C illustrates an example deployment in which the computer network security system and the CGR system shown in FIG. 1A operate in a common cloud computing environment, in accordance with some embodiments of the technology described herein.

FIG. 1C illustrates an example deployment in which the computer network security system 110 and the CGR system 120 shown in FIG. 1A operate in a common cloud computing environment 150, in accordance with some embodiments of the technology described herein. In the example embodiment of FIG. 1C, the CGR 120 and computer network security system 110 may be implemented in a shared set of computing resources. For example, the computer network security system 110 and the CGR system 120 may be implemented using a pool of servers and storage. In some embodiments, the cloud computing environment 150 may be a cloud computing environment provided by a cloud service provider. The computing resources provided by the cloud service provider may be used to implement the computer network security system 110 and the CGR system 120. For example, the computer network security system 110 and the CGR system 120 may be implemented as containerized applications executed by servers in the common cloud computing environment 150. The computer network security system 110 and the CGR system 120 may use shared storage resources.

Figure 1D:
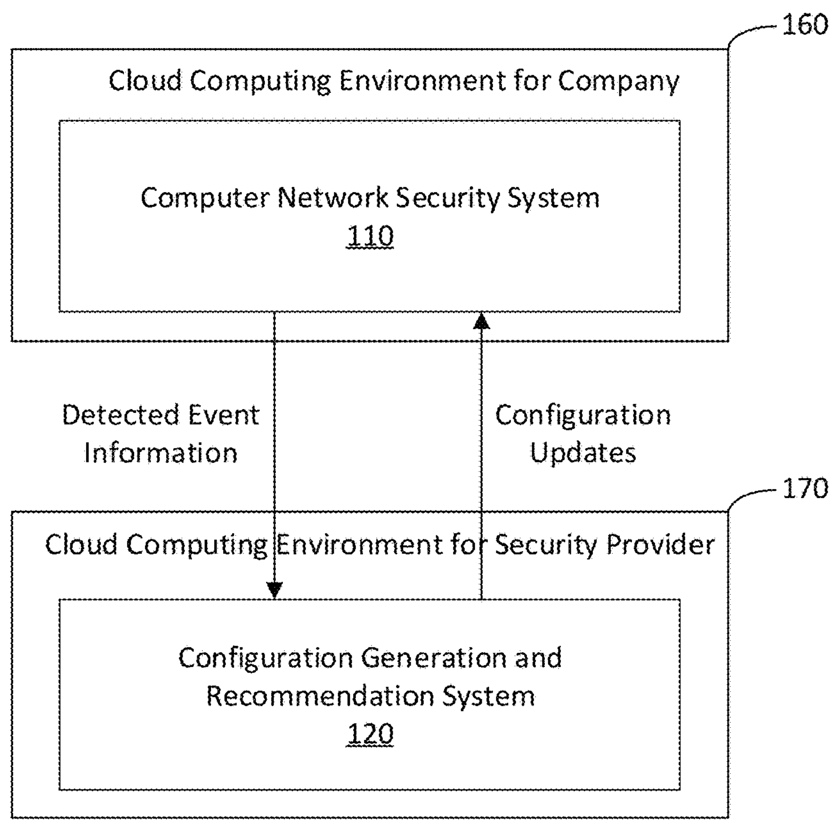
FIG. 1D illustrates an example deployment in which the computer network security system and the CGR system shown in FIG. 1A operate in separate cloud computing environments, in accordance with some embodiments of the technology described herein.

FIG. 1D illustrates an example deployment in which the computer network security system 110 and the CGR system 120 shown in FIG. 1A operate in separate cloud computing environments, in accordance with some embodiments of the technology described herein. As illustrated in the example embodiment of FIG. 1D, the computer network security system 110 may be implemented on a cloud computing environment 160 for a company. For example, the computer network security system 110 may be implemented on a set of computing resources used by the company to execute one or more software applications for which the computer network security system 110 provides security. Software modules of the computer network security system 110 may be executed by servers in the cloud computing environment 160 of the company. In the example embodiment of FIG. 1D, the CGR system 120 is implemented in a separate cloud computing environment of a security provider 170. The CGR system may be implemented on a separate set of computing resources from those of the cloud computing environment 160 for company. For example, the cloud computing environment of the security provider 170 may be a first set of computing resources provided (e.g., provided by a cloud service provider) and the cloud computing environment of the company 160 may be a second set of computing resources different from the first set.

Figure 2:
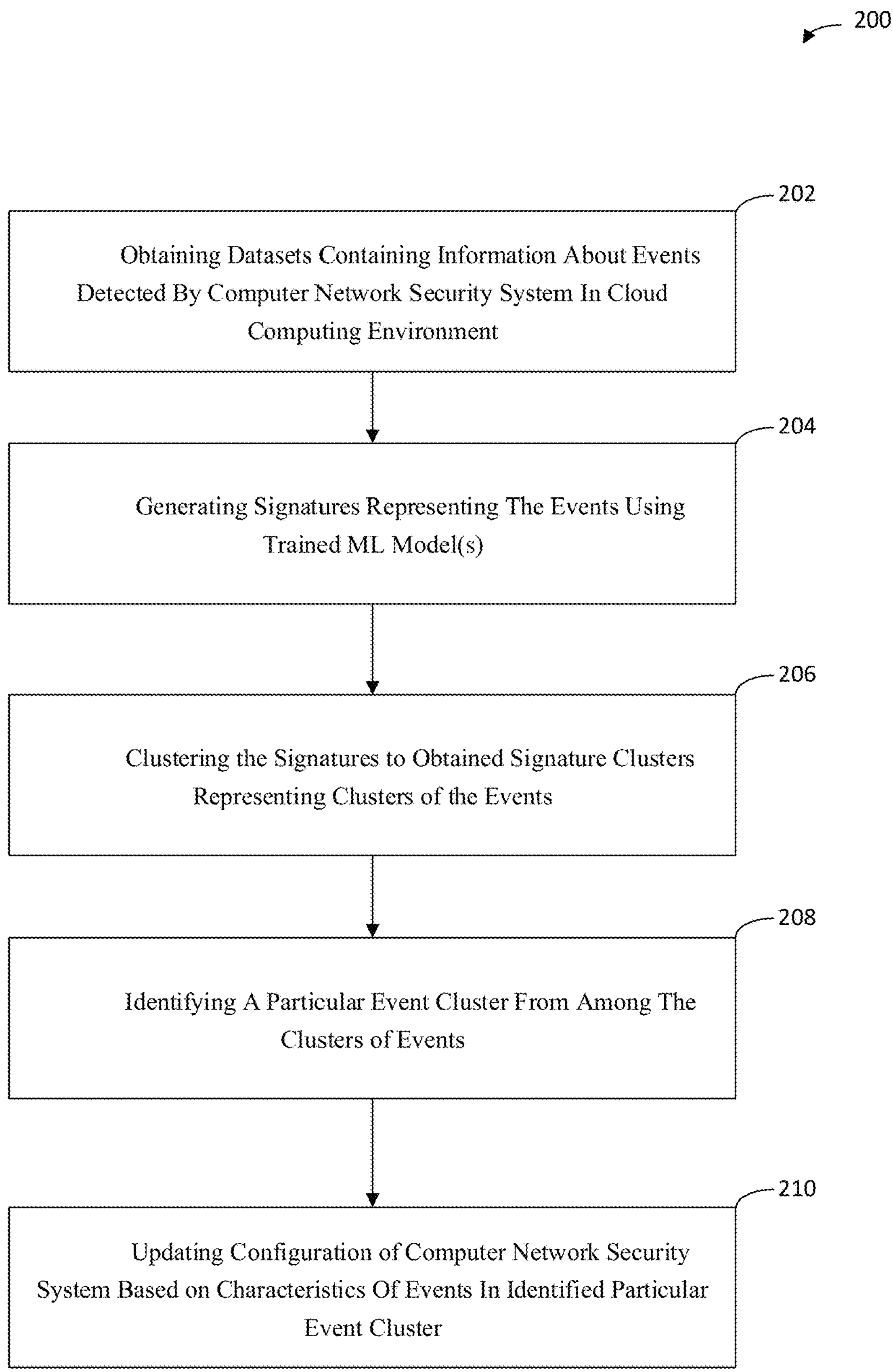
FIG. 2 is a flowchart of an illustrative process 200 for using machine learning to update configuration of a computer network security system, in accordance with some embodiments of the technology described herein.

FIG. 2 is a flowchart of an illustrative process 200 for using machine learning to update configuration of a computer network security system, in accordance with some embodiments of the technology described herein. In some embodiments, process 200 may be performed by the CGR system 120 described herein with reference to FIG. 1A. For example, the CGR system 120 may be configured to perform the process 200 to make configuration updates 125 to the computer network security system 110. In some embodiments, the computer network security system 110 may be a WAF (e.g., WAF 160 described herein with reference to FIG. 1B).

Process 200 begins at block 202, where the system performing process 200 obtains data sets containing information about events detected by a computer network security system (e.g., computer network security system 110) in a cloud computing environment (e.g., cloud computing environment 101). In some embodiments, the system may be configured to obtain the datasets generated by event detection agents (e.g., event detection agents 118-1, 118-2 . . . 118-M) that are configured to detect events. For example, each of the event detection agents may detect events of a certain type (e.g., a type of attack). Information in a dataset may include numerical, categorical, and/or textual information about an event. For example, the information may include a response code, time of event detection, input to a software application included in a request (i.e., payload), header of a transmitting entity, IP address of a transmitting entity, and/or other information.

In some embodiments, the system may be configured to obtain datasets by monitoring traffic to/from one or more software applications and generating the datasets. For example, the system may use event detection agents to monitor traffic, detect events, and generate datasets including information about detected events. In some embodiments, the system may be configured to obtain datasets that were previously generated. For example, the system may access previously generated datasets stored in a datastore (e.g., a database, a data lake, and/or other datastore).

In some embodiments, the system may be configured to obtain datasets containing information about detected events periodically. For example, the system may obtain the datasets daily, weekly, monthly, yearly, or at another suitable frequency. The system may be configured to automatically access the datasets. For example, the datasets may be automatically sent to the system periodically, or the system may periodically transmit a query to the computer network security system for the datasets. In some embodiments, the system may be configured to obtain datasets containing information about detected events in response to a command (e.g., a user command and/or a command generated by a software application). In some embodiments, the system may be configured to obtain datasets when the system has determined a condition has been met. For example, the system may obtain the datasets when a threshold number of datasets have been generated by the computer network security system.

In some embodiments, the system may be configured to organize the data (e.g., based on application, event type, detection time, and/or other criteria). In some embodiments, the system may be configured to organize the data by partitioning the datasets into multiple groups. The system may be configured to partition the datasets based on software application, event type, detection time, and/or other criteria. For example, the system may store datasets associated with events detected in traffic to/from a first software application in a first collection (e.g., for use in making configuration updates for monitoring performed for the first software application), and datasets associated with events detected in traffic to/from a second software application in a second collection (e.g., for use in making configuration updates for monitoring performed for the second software application). As another example, the system may store datasets for a first event type (e.g., type of attack) in a first collection and datasets for a second event type in a second collection. In some embodiments, different collections of datasets may be processed separately in the subsequent steps of process 200.

Next, process 200 proceeds to block 204, where the system generates signatures representing the events using one or more trained machine learning (ML) models.

In some embodiments, the system may be configured to generate initial numerical representations of data in the datasets. In some embodiments, the system may be configured to generate the initial numerical representations using textual data in the datasets. For example, the system may generate the initial numerical representations using textual payload data in the datasets (e.g., text of a request to be processed by a destination software application). In some embodiments, the system may be configured to generate a numerical representation of textual data in a dataset by: (1) generating a numerical representations of portions (e.g., characters, words, or other delimited portions) of the textual data; and (2) generating the initial numerical representation as a combination of numerical representations of the portions. For example, the textual data may include a certain number of characters (e.g., 100 characters, 120 characters, or 150 characters). The system may obtain a numerical representation for each character consisting of a vector of numerical values (e.g., floating point values, integer values, and/or other types of numerical values). For example, the vector of numerical values may include 50, 100, 150, 200, 250, 300, 350, 400, 450, or 500 numerical values. The system may generate a matrix (e.g., a 120×300 matrix) using the vectors (e.g., by storing the vectors as columns or rows of the matrix). For example, the system may generate a 100×50 matrix, 100×100 matrix, 100×150 matrix, 100×200 matrix, 100×300 matrix, 100×350 matrix, 100×400 matrix, 100×450 matrix, 100×500 matrix, 120×50 matrix, 120×100 matrix, 120×150 matrix, 120×200 matrix, 120×300 matrix, 120×350 matrix, 120×400 matrix, 120×450 matrix, 120×500 matrix, 150×50 matrix, 150×100 matrix, 150×150 matrix, 150×200 matrix, 150×300 matrix, 150×350 matrix, 150×400 matrix, 150×450 matrix, or 150×500 matrix.

In some embodiments, the system may be configured to generate a numerical representation of a portion of textual data (e.g., a character) using a pre-trained embedding model. For example, the system may use a pre-trained character embedding model to generate numerical representations of characters. Example embedding models that may be used by the system are described herein with reference to the CGR system 120 of FIG. 1A.

In some embodiments, the system may be configured to generate signatures representing datasets using initial numerical representations of the datasets (e.g., generated from numerical representations of characters in the datasets). The system may be configured to provide an initial numerical representation of a dataset as input to a trained machine learning model to obtain a signature representing the dataset. In some embodiments, the trained machine learning model may be an autoencoder trained to compress input data into an encoded representation. The system may be configured to provide the initial numerical representation of a dataset as input to the autoencoder to obtain a compressed representation. For example, the system may input a 120×300 matrix (e.g., storing vectors representing characters of text in the dataset) to the autoencoder and obtain a vector of 64 numerical values. The output of the autoencoder may be used as a signature representing an event associated with the dataset.

In some embodiments, an autoencoder used by the system may be an artificial neural network (ANN) trained to encode data into a compressed representation, and to reconstruct the data from the compressed representation. For example, the autoencoder may be a convolutional autoencoder, a variational autoencoder, a deep autoencoder, or other suitable autoencoder. The autoencoder may be trained by: (1) generating encoded representations of input data samples; (2) generating reconstructions of the input data samples using the autoencoder; and (3) updating parameters of the autoencoder based on a difference between the reconstructions of the input data samples and the original input data samples. Accordingly, the autoencoder may be trained to generate a compressed representation of an input data sample (e.g., an initial numerical representation of a dataset).

In some embodiments, an autoencoder used by the system may be continuously trained over time. In some embodiments, the autoencoder may be trained when its performance falls below a threshold (e.g., a threshold f-1 score). In some embodiments, the autoencoder may be retrained incrementally using newly available data. For example, the autoencoder may be retrained periodically using an updated set of input data samples (e.g., initial numeric representations of datasets). For example, the autoencoder may be retrained using a certain number of the most recent input data samples (e.g., 100, 200, 500, 1000, 10,000, or other number of samples). As another example, the autoencoder may be retrained when a threshold number of new input data samples have been processed by the autoencoder. By continuously training the autoencoder with recent data, the autoencoder may mitigate compression loss resulting from shifts in datasets over time.

In some embodiments, the system may be configured to use different machine learning models to generate signatures for different events. In some embodiments, the system may be configured to use different machine learning models for different event types. For example, the system may use a first machine learning model (e.g., a first autoencoder) for generating signatures representing events of a first type (e.g., a first type of attack) and a second machine learning model (e.g., a second autoencoder) for generating signatures representing events of a second type (e.g., a second type of attack). In this example, the system may: (1) provide a first initial numerical representation of a dataset including information about an event of the first type as input to the first machine learning model to obtain a signature representing the event of the first type; and (2) provide a second initial numerical representation of a dataset including information about an event of a second type as input to the second machine learning model to obtain a signature representing the event of the second type. In some embodiments, the system may be configured to use different machine learning models for different software applications. For example, the system may use a first machine learning model for a first software application and a second machine learning model for a second software application. In this example, the system may: (1) provide a first initial numerical representation of a dataset including information about a first event detected for the first software application to the first machine learning model to obtain a signature representing the first event; and (2) provide a second initial numerical representation of a dataset including information about a second event detected for the second software application as input to the second machine learning model to obtain a signature representing the second event.

In some embodiments, the system may be configured to use a set of multiple machine learning models for each software application. For example, the system may use different machine learning models for different types of events detected for the software application. To illustrate, the system may use, for a first software application: (1) a first autoencoder for SQL injection attacks detected for the first software application; and (2) a second autoencoder for XXE attacks detected for the first software application. The system may further use, for a second software application: (1) a third autoencoder for SQL injection attacks detected for the second software application; and (2) a fourth autoencoder for XXE attacks detected for the second software application.

After generating the signatures representing events at block 204, process 200 proceeds to block 206, where the system clusters the signatures to obtain signature clusters representing clusters of events. In some embodiments, the system may be configured to perform clustering of a set of signatures using a clustering algorithm. Example clustering algorithms are described herein with reference to the CGR system 120 of FIG. 1A. The system may apply a clustering algorithm to a set of signatures to obtain the event clusters. In some embodiments, the system may be configured to generate a specific number of clusters (e.g., 2, 3, 4, 5, 6, 7, 8, 9, or 10 clusters). In some embodiments, the system may be configured to dynamically determine a number of clusters. For example, the clustering algorithm used to perform the clustering may determine a number of clusters.

In some embodiments, the clustering performed at block 204 may be performed subsequent to a previous iteration of clustering that had been performed by the system (e.g., using signatures generated from another set of datasets including information about detected events). The system may be configured to use event clusters determined from the previous iteration of clustering to cluster the signatures. In some embodiments, the system may be configured to seed a clustering algorithm with event clusters determined from the prior iteration of clustering. For example, the system may use the event clusters identified from the previous iteration of clustering as an initial set of event clusters to use when performing the clustering algorithm.

In some embodiments, the system may be configured to associate one or more of the signatures obtained at block 204 with an event cluster determined in the previous iteration of clustering. For example, the system may associate a given signature with an event cluster determined from the previous iteration of clustering by: (1) determining a measure of similarity (e.g., a distance) between the given signature and each of multiple event clusters determined in the previous iteration of clustering; and (2) associating the signature to one of the event clusters that the signature is most similar to (e.g., for which it has the greatest measure of similarity).

In some embodiments, the system may be configured to identify outlier events using signatures representing the events (e.g., in addition to and/or instead of the clustering). An outlier event may be used in the process to update a configuration of the computer network security system (e.g., as described with reference to block 210). The system may be configured to identify outliers using the signatures representing datasets. For example, the system may use empirical cumulative distribution-based outlier detection (ECOD) to identify outlier events. As another example, the system may use copula-based outlier detection (COPOD) to identify outlier events. As another example, the system may determine a cumulative distribution function (CDF) representing the signatures, and identify outlier events using the CDF.

Next, process 200 proceeds to block 208, where the system identifies a particular event cluster from the clusters of events obtained at block 206. In some embodiments, the system may be configured to identify an event cluster based on user input received through a GUI. The system may be configured to generate a visualization of the event clusters in the GUI. For example, the system may display graphical elements representing respective event clusters in a graph (e.g., a 2D or a 3D graph) shown in the GUI. The system may be configured to receive user input indicating a selection of an event cluster. For example, the GUI may allow the user to select a graphical element representing an event cluster displayed in the GUI (e.g., by clicking, tapping, highlighting, or providing other user input indicating selection of the event cluster). To illustrate, the system may allow the user to select a graphical element representing an event cluster and present a menu in response to selection of the graphical element. The menu may provide an option to the user to generate a rule based on the selected event cluster.

In some embodiments, the system may be configured to allow the user to view information about events in a cluster. The system may be configured to provide a GUI through which the user can: (1) select an event cluster; and (2) access information about events in the cluster. For example, upon selection of a graphical element in a graph representing an event cluster, the GUI may provide a user an interface through which the user can view data (e.g., payload, IP addresses, headers, and/or other data) from the datasets including information about events in the cluster. In some embodiments, the system may be configured to indicate outlier signatures in the GUI. For example, the system may generate a plot of the signatures and highlight signatures that were identified as outliers. The user may use the indication of outliers to determine input to provide through the GUI (e.g., input indicating one or more rules to configure the computer network security system with).

In some embodiments, the system may be configured to apply a dimensionality reduction technique to event clusters to obtain lower dimensional representations of the event clusters. Example dimensionality reduction techniques are described herein. The system may be configured to generate a visualization of event clusters using the representations of reduced dimensionality. For example, the dimensionality reduction technique may reduce an event cluster from 64 dimensions to 2 dimensions or 3 dimensions. This may allow the event clusters to be plotted on a graph (e.g., a 2D graph or a 3D graph) displayed in the GUI.

In some embodiments, the system may be configured to automatically identify a particular event cluster. The system may be configured to identify the event cluster by applying one or more pre-defined rules to characteristics of events in each of the event clusters. For example, the system may determine that if a certain number of events in a cluster have characteristics matching those of an attack, the system may identify the event cluster. As another example, the system may identify a particular event cluster based on a number of events in the cluster. The system may determine to select the event cluster when there are a threshold number of events in the cluster.

Next, process 200 proceeds to block 210, where the system updates a configuration of the computer network security system based on characteristics of events in the event cluster identified at block 208. In some embodiments, the system may be configured to generate one or more rules based on characteristics of the events in the cluster. The system may be configured to generate a rule based on a characteristic of events in a cluster by: (1) specifying a characteristic that is to be identified; and (2) specifying an action to be performed in response to determining that a communication (e.g., an HTTP request or an API call) has the characteristic. For example, the system may generate a rule to block communications from IP addresses common to events in the cluster. As another example, the system may generate a rule to block communications including an input request pattern (e.g., an HTTP request pattern).

In some embodiments, the system may be configured to generate a rule to filter events having a characteristic shared by events in the event cluster from being considered as a security threat. For example, the system may receive input through a GUI indicating that certain IP addresses associated with events in a cluster are trusted sources. In response to the user input, the system may generate a filter rule that allows communications from those IP addresses to access a software application. The filter rule may facilitate removing known benign traffic from processing performed by the computer network security system. This may improve efficiency and precision of the computer network security system in identifying events that present a security risk to a software application.

In some embodiments, the system may be configured to update a configuration of the computer network security system by transmitting one or more generated rules to the computer network security system. The rule(s) may be added to an existing set of rules that is used by the computer network security system in controlling traffic. For example, the computer network security system may begin applying the rule(s) as part of its monitoring processes for one or more software applications. In some embodiments, the system may be configured to transmit information indicating characteristic(s) of events in the identified cluster to the computer network security system for use in generating rule(s). The computer network security system may use the information to generate rule(s) that it uses to control traffic.

In some embodiments, process 200 may be performed continuously. For example, the process 200 may be performed periodically (e.g., daily, weekly, or monthly). As another example, the process 200 may be performed by the system in response to detecting a particular condition (e.g., detection of a threshold number of events in a given time period). As another example, the process 200 may be performed by the system in response to an application command.

Figure 3:
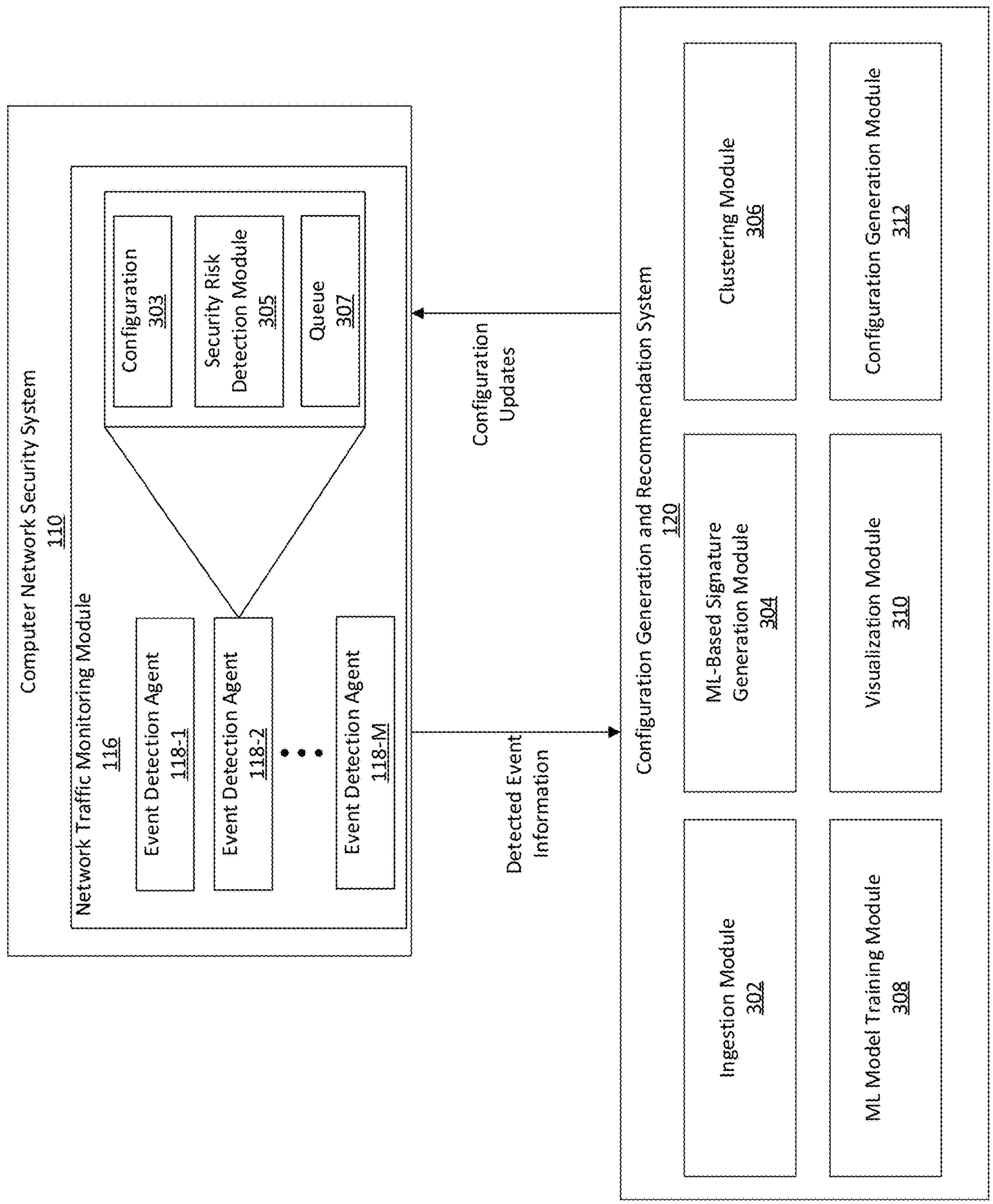
FIG. 3 is a diagram illustrating components of the computer network security system and the CGR system shown in FIG. 1A, in accordance with some embodiments of the technology described herein.

FIG. 3 is a diagram illustrating components of the computer network security system 110 and the configuration generation and recommendation system 120 shown in FIG. 1A, in accordance with some embodiments of the technology described herein. FIG. 3 shows example components of an event detection agent 118-2 of the network traffic monitoring module 116 of the computer network security system 110. As illustrated in the example embodiment of FIG. 3, the event detection agent 118-2 includes a configuration component 303, a security risk detection module 305, and a queue 307.

In some embodiments, the configuration component 303 of the event detection agent 118-2 may be configured to manage event detection performed by the agent. The configuration component 303 may be configured to determine a configuration according to which the event detection agent 118-2 performs event detection. In some embodiments, the configuration component 303 may configure the event detection agent 118-2 to recognize a pattern when processing a communication (e.g., an HTTP request or an API call). In some embodiments, the configuration component 303 may configure the event detection component 118-2 to detect an anomaly in a communication.

In some embodiments, the configuration component 303 may configure the event detection agent 118-2 to identify the communication as an event when the event detection agent 118-2 identifies a pattern in the communication. For example, the configuration component 303 may specify a regular expression that can be used to recognize string patterns. As another example, the configuration component 303 may configure the event detection component 118-2 to use a trained machine learning model in detecting events. The configuration component 303 may store parameters of the trained model that are to be used in determining an output of the machine learning model for an input. For example, the trained machine learning model may be used to determine a classification of a communication as an event (e.g., a potential attack) or not an event (e.g., not a potential attack).

In some embodiments, the configuration component 303 may be configured to store information indicating anomalies that trigger detection of an event. The configuration component 303 may store information for an anomaly based on an event type (e.g., attack type) that the event detection agent 118-2 is to detect. For example, the configuration component 303 may store an indication of functionality (e.g., execution of certain scripts) that is prohibited from access (e.g., determined based on observation and/or user input). As another example, the configuration component 303 may specify URLs that are excluded from access (e.g., as determined from user input). As another example, the configuration component 303 may store an indication of commands (e.g., OS commands) that cannot be submitted to a software application. As another example, the configuration component 303 may store an indication of SQL statements that are prohibited from being executed. As another example, the configuration component 303 may store an indication of headers that are allowed (e.g., in an XML input).

In some embodiments, the configuration component 303 may be configured to store one or more filter rules. The filter rule(s) may be used by the event detection agent 118-2 to filter out communications from being considered for detection as an event. For example, the filter rule(s) may specify certain IP addresses that are trusted and thus communications from those IP addresses are not to be considered for detection as events. As another example, the filter rule(s) may specify certain functionality, commands, URLs, and/or SQL statements that are permissible or otherwise do not pose a security risk.

In some embodiments, the security risk detection module 305 may be configured to detect events based on a configuration of the configuration component 303. For example, the security risk detection module 305 may be configured to search for a pattern (e.g., indicated by a regular expression) specified by the configuration component 303 as being associated with a potential attack. As another example, the security risk detection module 305 may use a trained machine learning model to classify a communication as an event (e.g., by providing input to the machine learning model to obtain an output indicating a classification). As another example, the security risk detection module 305 may determine whether a communication is anomalous using configuration information (e.g., prohibited functionality, URLs excluded from access, prohibited commands, prohibited SQL statements, and/or improper headers). In some embodiments, the security risk detection module 305 may be configured to filter communications from consideration as events using filter rule(s) configured by the configuration component 303.

In some embodiments, the security risk detection module 305 may be configured to generate a dataset including information about a detected event. Example data that may be included in the dataset is described herein. The security risk detection module 305 may be configured to generate a dataset when an event is detected (e.g., when an HTTP request is determined to be a potential attack). The security risk detection module 305 may store generated datasets in the queue 307.

In some embodiments, the queue 307 may be storage for datasets corresponding to detected events. The queue 307 may store the datasets to be forwarded by the event detection agent 118-2 to the CGR system 120 and/or other modules of the computer network security system 110. For example, the queue 307 may provide a buffer where dataset(s) may be stored until detected event information is transmitted to the CGR system 120. In some embodiments, the event detection agent 118-2 may be configured to transmit dataset(s) on the queue 307 to another server for transmission to the CGR system 120 and/or for storage.

As shown in the example embodiment of FIG. 3, the CGR system 120 includes an ingestion module 302, an ML-based signature generation module 304, a clustering module 306, an ML model training module 308, a visualization module 310, and a configuration generation module 312.

In some embodiments, the ingestion module 302 may be configured to obtain data from the computer network and security system 110. The ingestion module 302 may obtain datasets including information about respective events. For example, the ingestion module 302 may obtain the datasets from a server executing event detection agents 118-1, 118-2 . . . 118-M. In some embodiments, the ingestion module 302 may be configured to partition datasets obtained from the computer network and security system 110. The ingestion module 302 may be configured to partition the datasets based on various properties of the datasets.

In some embodiments, the ingestion module 302 may be configured to partition the datasets based on a software application corresponding to the event (e.g., a software application that an HTTP request or an API call was directed to). The datasets may include an indication of a software application (e.g., an ID, name, or other identifier) that the ingestion module 302 uses to partition the datasets. For example, the ingestion module 302 may partition a first subset of datasets obtained from the computer network and security system 110 into a first group associated with a first software application and a second subset of the datasets into a second group associated with a second software application based on the software application indicated by metadata in the datasets.

In some embodiments, the ingestion module 302 may be configured to partition datasets obtained from the computer network and security system 110 based on event detection agents that generated the datasets. Each of the event detection agents may be configured to detect an event of a particular type. For example, each of the data detection agents may have a sensor (e.g., an SQL injection attack sensor, an XXE attack sensor, and/or other sensors) configured to detect a particular type of attack. The ingestion module 302 may partition the datasets based on event types the datasets are associated with. For example, the ingestion module 302 may determine an event type associated with a dataset based on a sensor that detected the dataset (e.g., indicated by a field in the dataset).

In some embodiments, the ingestion module 302 may be configured to partition datasets obtained from the computer network and security system 110 based on times at which events were detected. The ingestion module 302 may be configured to use timestamps included in the datasets to organize the datasets into different groups based on time. For example, the ingestion module 302 may store collections of datasets for different time periods (e.g., days, weeks, months, and/or another time period).

In some embodiments, the ingestion module 302 may be configured to partition datasets based on multiple different properties described herein. The ingestion module 302 may be configured to partition datasets based on a hierarchy of properties. For example, the ingestion module 302 may initially partition datasets based on their corresponding software application. The ingestion module 302 may then partition the datasets corresponding to a particular software application based on event type. The ingestion module 302 may further partition datasets corresponding to a particular software application and a particular event type based on time.

In some embodiments, the ingestion module 302 may be configured to validate datasets obtained from the computer network and security system 110. The ingestion module 302 may be configured to validate a dataset by verifying that they were received from a trusted source (i.e., the computer network and security system 110). For example, the ingestion module 302 may validate a dataset by determining whether a field in the dataset (e.g., storing a password, token, or other secret) has a valid value.

In some embodiments, the ML-based signature generation module 304 (also referred to herein as "signature generation module 304") may be configured to use detected event information to generate signatures representing events. The signature generation module 304 may be configured to generate a signature representing an event using data from a dataset including information about the event. The signature generation module 304 may be configured to use one or more trained machine learning models to generate signatures representing events. In some embodiments, the signature generation module 304 may be configured to generate a signature representing an event by: (1) generating an initial numerical representation of data from a dataset including information about the event; and (2) providing the input into a trained machine learning model to obtain the signature.

In some embodiments, the signature generation module 304 may be configured to generate an initial numerical representation of data from a dataset using a pre-trained embedding model. For example, the signature generation module 304 may obtain textual data from the dataset (e.g., text of an HTTP request or an API call). The signature generation module 304 may tokenize the text and provide the tokens as input to the pre-trained embedding model to obtain numerical representations for each token. In some embodiments, the signature generation module 304 may be configured to tokenize the text by character. The signature generation module 304 may provide each character into a character embedding model to obtain a numerical representation of the character (e.g., a vector of numerical values). The signature generation module 304 may obtain numerical representations of all the characters and generate the initial numerical representation of the data using the numerical representations. For example, the signature generation module 304 may store vectors representing respective characters in a matrix that forms the initial numerical representation.

In some embodiments, the signature generation module 304 may be configured to provide an initial numerical representation of data from a dataset including information about an event as input to a trained machine learning model (e.g., a neural network). The output of the trained machine learning model may be the signature representing the event. In some embodiments, the trained machine learning model may generate a compressed representation of the initial numerical representation. For example, the trained machine learning model may be an autoencoder that encodes the initial numerical representation into a fixed set of values (e.g., a vector of 64 values). Example autoencoders are described herein.

In some embodiments, the signature generation module 304 may be configured to use multiple machine learning models. The signature generation module 304 may be configured to use different machine learning models for different partitions of datasets. For example, the signature generation module 304 may be configured to use different machine learning models for different event types, different applications, different time periods, and/or other partitions. Each machine learning model may be trained using data corresponding to the machine learning model. For example, a machine learning model (e.g., an autoencoder) for a given software application may be trained using data associated with events detected for the given software application. As another example, a machine learning model for a given event type may be trained using events of that type.

In some embodiments, the clustering module 306 may be configured to cluster signatures representing events generated by the ML-based signature generation module 304. The clustering module 306 may be configured to perform clustering using a clustering algorithm. Example clustering algorithms are described herein. For example, the clustering module 306 may apply a clustering algorithm to a set of signatures to obtain multiple different signature clusters. Each of the signature clusters may represent a cluster of events. In some embodiments, the clustering module 306 may be configured to use a clustering result obtained from performing clustering in performance of subsequent clustering. For example, when performing the subsequent clustering, the clustering module 306 may seed a clustering algorithm with signature clusters of the prior clustering result.

In some embodiments, the clustering module 306 may be configured to determine statistics about events in a particular cluster. For example, the clustering module 306 may be configured to determine a CDF of events in a cluster. In some embodiments, the clustering module 306 may be configured to identify outlier events within a cluster. Example techniques of identifying outlier events are described herein.

In some embodiments, the ML model training module 308 (also referred to herein as "training module 308") may be configured to train machine learning model(s) used by the ML-based signature generation module 304. For example, the training module 308 may train an autoencoder used by the signature generation module 304. The training module 308 may train the autoencoder by (1) generating encoded representations of input data samples (e.g., initial numerical representation samples generated from data in datasets including information about events); (2) generating reconstructions of the input data samples using the autoencoder; and (3) updating parameters of the autoencoder based on a difference between the reconstructions of the input data samples and the original input data samples. An encoder portion of the trained autoencoder may then be used by the signature generation module 304.

For example, the ML training module 308 may generate an autoencoder by obtaining a machine learning model (e.g., a neural network) with an architecture comprising of two components: an encoder and a decoder. The encoder encodes input data into a compressed representation with lower dimensions than the input data. The decoder generates a reconstruction of the input data using the compressed representation. The ML training module 308 may train the machine learning model by minimizing an error between reconstructions of input data and the original input data. For example, the ML training module 308 may use a loss function (e.g., mean squared error (MSE), binary cross-entropy loss, or other loss function) to minimize the error. Example techniques for generating and training an autoencoder are described in "Reducing the Dimensionality of Data with Neural Networks" published on Jul. 28, 2006, in vol. 313, issue 5786 pp. 504-507 of Science.

In some embodiments, machine learning model(s) used by the signature generation module 304 may be continuously trained. A machine learning model may be retrained using additional data obtained by the signature generation module 304. For example, an autoencoder used by the model may be retrained using a set of most recent initial numerical representations of data from datasets corresponding to events. Accordingly, encoding performed using the autoencoder to generate signatures will reflect the latest data.

In some embodiments, the training module 308 may be configured to train an embedding model used by the signature generation module 304. For example, the training module 308 may train a character embedding model used to generate initial numerical representations of data from datasets. In some embodiments, the training module 308 may be configured to: (1) obtain a pretrained embedding model; and (2) perform one or more additional training iterations using application specific data. For example, the training module 308 may further train a character embedding model using data from datasets including information about the events. This may provide a character embedding model that is customized for the type of data that will be used by the CGR system 120.

In some embodiments, the visualization module 310 may be configured to generate visualizations of event clusters determined by the clustering module 306. In some embodiments, the visualization module 310 may be configured to generate a GUI including a graphical depiction of event clusters. For example, the GUI may include a 2D or 3D graph with different points in the graph representing different event clusters. In some embodiments, the GUI may allow a user to select a point representing a particular event cluster to view information about events in the cluster (e.g., characteristics shared by events in the cluster). For example, the GUI may allow a user to view one or more IP addresses shared by events in the cluster, an event type shared by events in the cluster, and/or other characteristics shared by events in the cluster.

In some embodiments, the visualization module 310 may be configured to apply a dimensionality reduction technique to event clusters to obtain representations of the clusters of reduced dimensions. The visualization module 310 may be configured to use the representations of reduced dimension to generate the visualizations. For example, the visualization module 310 may generate 2D or 3D representations of event clusters that can be plotted in a graph shown in a GUI.

In some embodiments, the visualization module 310 may be configured to provide visualizations of events in an event cluster. For example, the visualization module 310 may provide a visualization of a distribution of events in a cluster. In some embodiments, the visualization module 310 may be configured to indicate outlier events in a visualization. For example, the visualization module 310 may generate a CDF visualization of events in an event cluster. The CDF visualization may allow a user to identify one or more characteristics for use in configuring the computer network and security system 110 (e.g., characteristic(s) associated with outlier events).

In some embodiments, the configuration generation module 312 may be configured to make configuration updates to the computer network security system 110. In some embodiments, the configuration generation module 312 may be configured to make configuration updates by identifying an event cluster from among the event clusters determined by the clustering module 306. In some embodiments, the configuration generation module 312 may be configured to identify an event cluster based on user input (e.g., through a GUI provided by the visualization module 310). For example, the configuration generation module 312 may receive user input indicating a command to make a configuration update (e.g., by generating a rule) for a particular event cluster. In some embodiments, the configuration generation module 312 may be configured to automatically identify an event cluster. For example, the configuration generation module 312 may be configured to identify an event cluster by determining characteristics of events in the cluster that are malicious (e.g., by recognizing a banned IP address shared by events in the cluster).

In some embodiments, the configuration generation module 312 may be configured to make configuration updates by: (1) generating one or more rules based on an identified event cluster; and (2) configuring the computer network security system 110 to use the rule(s) in controlling traffic to/from one or more software applications. For example, a rule may identify one or more characteristics (e.g., an IP address, a pattern of request text, a requested function, and/or other characteristic) to be recognized in traffic, and a corresponding action (e.g., block, generate a notification, filter) to perform in response to recognizing the characteristic(s).

Figure 4A:
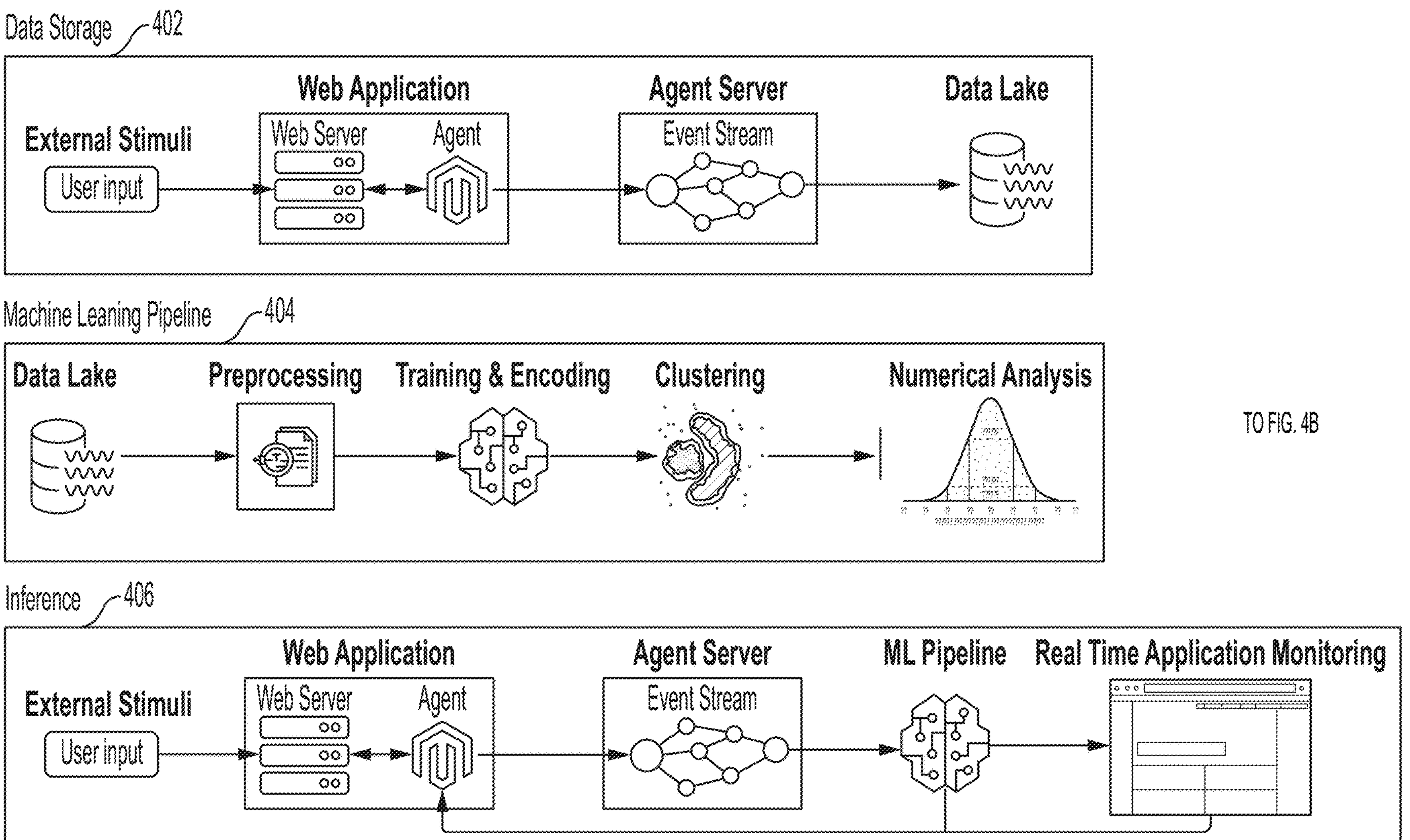
FIG. 4A and FIG. 4B are diagrams illustrating aspects of training and using machine learning models for updating configuration of a computer network security system, in accordance with some embodiments of the technology described herein.
Figure 4B:
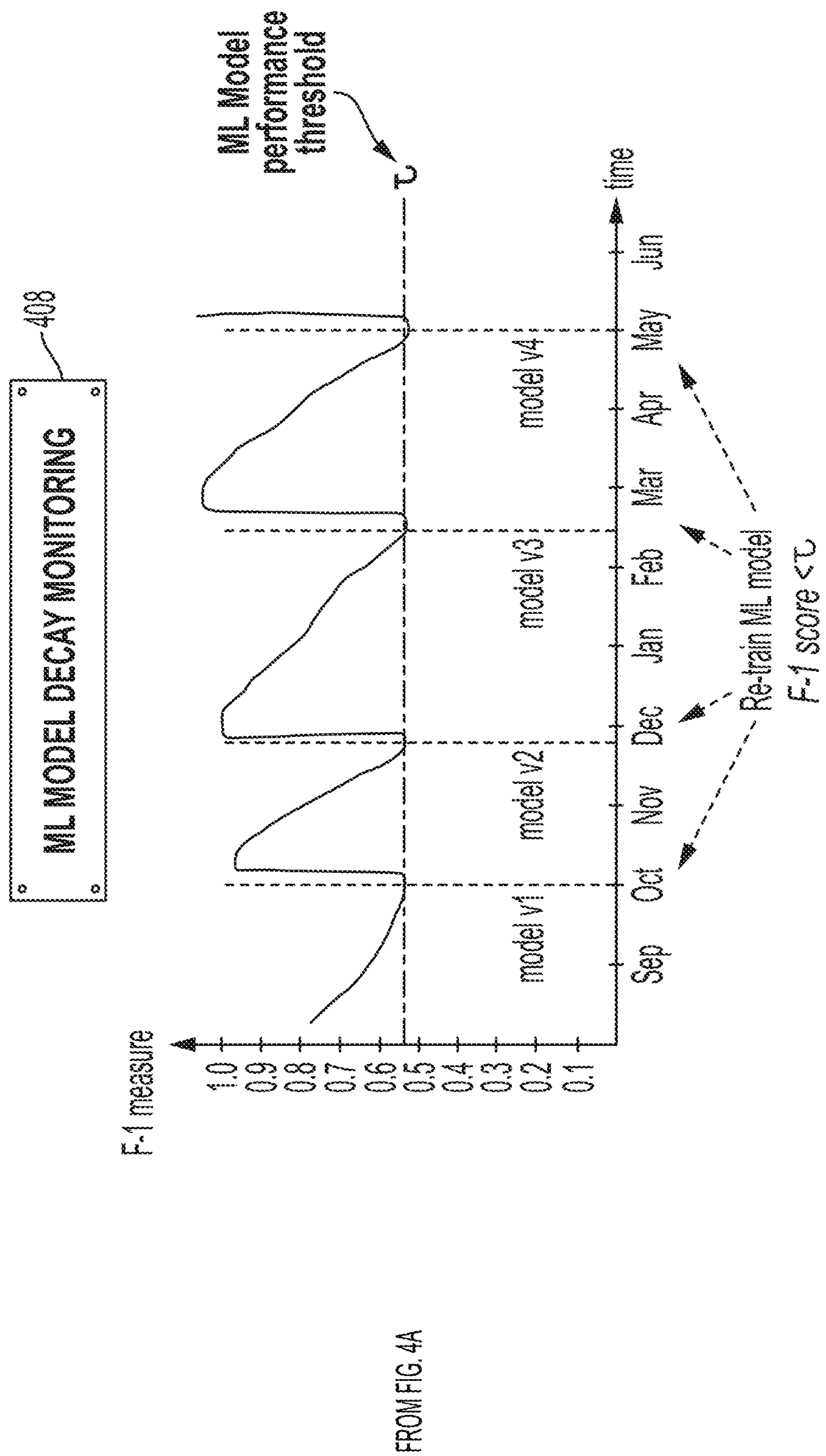

FIG. 4A and FIG. 4B are diagrams illustrating aspects of training and using machine learning models for updating configuration of a computer network security system, in accordance with some embodiments of the technology described herein. The diagrams of FIG. 4A and FIG. 4B illustrate various layers of processing that may be performed by a GDR system (e.g., GDR system 120 of FIG. 1A). The layers include a data storage layer 402, a machine learning pipeline 404, an inference layer 406, and ML model decay monitoring 408.

As illustrated in the example embodiment of FIG. 4A, in the data storage layer 402 an agent of the GDR system may be configured to monitor traffic to/from a web application being executed by a web server. As shown in the example of FIG. 4A, user input may be transmitted to the web application. For example, the user input may be an HTTP request transmitted from a device (e.g., using an Internet browser application executed by the device). The agent may be configured to process the input to determine if it constitutes an event. For example, the agent may determine whether the input is a potential attack on the web application. When the agent detects an event, the agent may transmit a dataset including information about the event to an agent server. The agent server may store the dataset in a data lake.

In the machine learning pipeline layer 404, the GDR system may be configured to use detected event information (e.g., datasets including information about detected events) to perform machine learning processing. In the example of FIG. 4A, the detected event information is read from a data lake. The GDR system performs preprocessing (e.g., to generate initial numerical representations of data from datasets), training (e.g., of a ML model for use in generating signatures), encoding (e.g., by using a trained ML model to generate signatures), and clustering to identify event clusters (e.g., by clustering generated signatures). The GDR system may further be configured to perform numerical analysis (e.g., on events across all clusters and/or on events within a cluster). For example, the GDR system may determine a CDF of events in a cluster and/or identify outlier events of a cluster (e.g., that may be of more interest in configuring a computer network and security system).

In the inference layer 406, the GDR system may be configured to use results of processing by the machine learning pipeline 404 to update a configuration of the agent monitoring the web application. In some embodiments, the configuration updates may be based on an identified event cluster from event clustering performed in the machine learning pipeline 404. The GDR system may be configured to generate additional rule(s) that are used by the agent in performing monitoring. For example, the rule(s) may cause the agent to identify events for which actions may be taken (e.g., blocking, generating a notification, and/or capturing of data). As another example, the rule(s) may filter communications from being processed by the agent (e.g., because they have characteristics indicating that they are benign as determined from the machine learning pipeline 404).

As shown in FIG. 4A, the interference stage 404 may include real time application monitoring. The real time application monitoring may be performed through a GUI provided by the GDR system. The GUI may allow a user to view activity of the GDR system including activity of specific event detection agents, activity with respect to a software application, and/or other activity. The GDR system may further receive user input through the GUI (e.g., a selection of an event cluster) that the GDR system may use in updating a configuration of the agent's monitoring.

The GDR system may be configured to perform ML model decay monitoring. For example, the GDR system may monitor performance of an ML model (e.g., an autoencoder) used to generate signatures representing events. As illustrated in the example embodiment of FIG. 4B, the system determines performance of the ML model at various times. The system retrains the ML model when the performance of the model falls below a threshold performance (e.g., a threshold F-1 score). For example, the system may retrain an autoencoder used in generating signatures when a reconstruction performance of the autoencoder falls below a threshold F-1 score. In the example of FIG. 4B, the system has retrained the model four times in a time period between September and May of a given year. The system may thus ensure a minimum level of performance of the ML model by continuously training the ML model.

Figure 5:
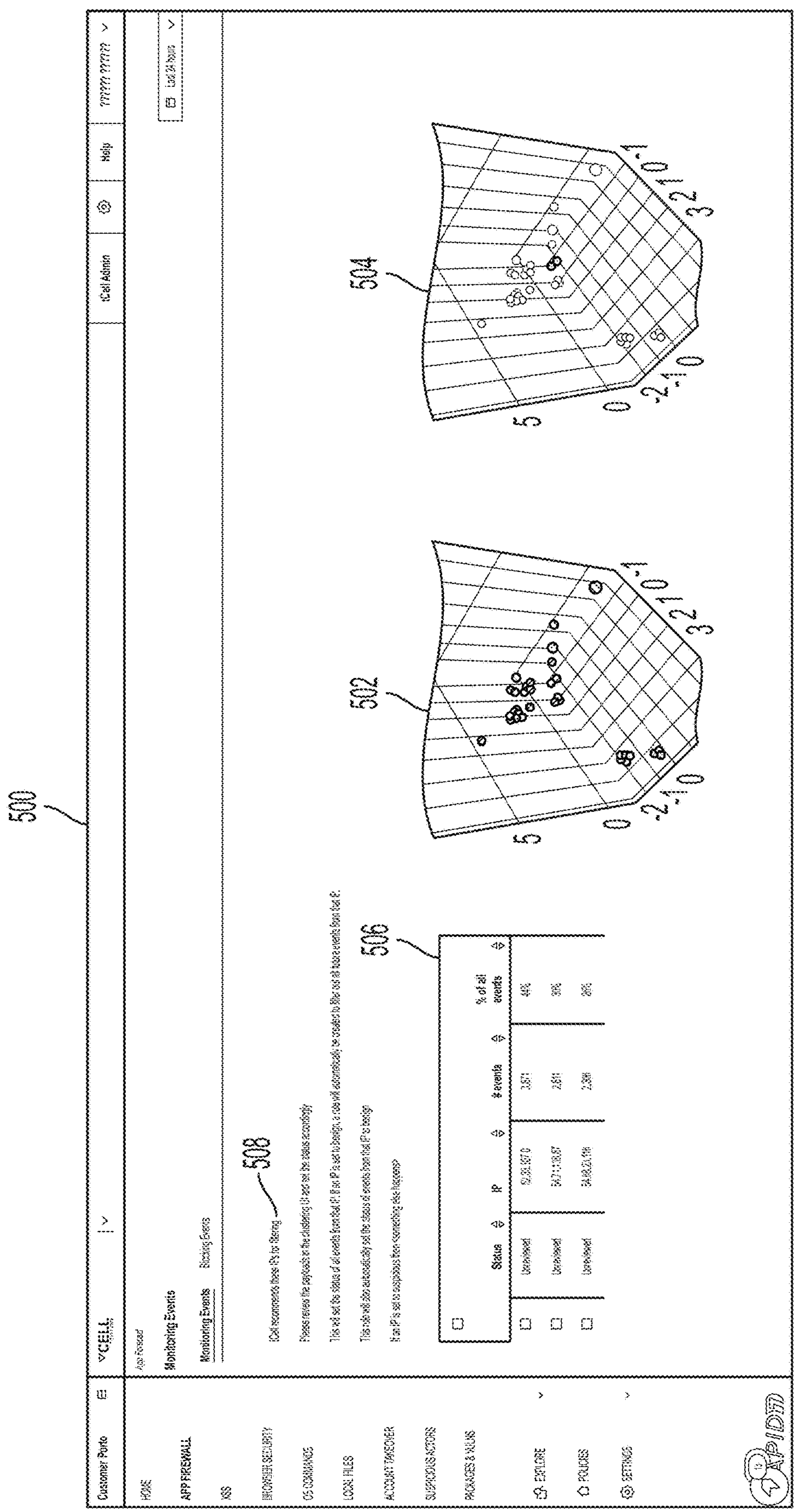
FIG. 5 is a diagram of an illustrative graphical user interface (GUI) through which a user may provide input to facilitate generation of an updated configuration for a computer network security system, in accordance with some embodiments of the technology described herein.

FIG. 5 is a diagram of an illustrative graphical user interface (GUI) 500 through which a user may provide input to facilitate generation of an updated configuration for a computer network security system, in accordance with some embodiments of the technology described herein. In some embodiments the GUI 500 may be generated by the visualization module 310 of the GDR system 120. As shown in FIG. 5, the GUI 500 includes 3D plots 502, 504 of signature clusters representing clusters of events. The 3D plots 502, 504 include graphical elements indicating the event clusters. In some embodiments, the GUI may allow a user to select an event cluster. The GUI portion 506 shows information about events in a selected event cluster. In the example of FIG. 5, the GUI portion 506 shows IP addresses along with a number of events and percentage of events associated with each IP address. The GUI 500 further includes a message 508 for the user indicating a recommendation to filter the IP addresses shown in the GUI portion 506 (e.g., so that they are not considered for event detection in subsequent monitoring by an agent).

FIG. 6 shows an example dataset 600 (e.g., a payload) containing information about an event detected by a computer network security system in the cloud computing environment. In some embodiments, the dataset of FIG. 6 may be generated by an event detection agent and used in determining configuration updates to a computer network and security system. As illustrated in FIG. 6, the dataset includes textual data of a request (e.g., an HTTP request) transmitted to a software application (e.g., a web application). The textual data includes a line 602 including a command to execute a script in a specified directory. The textual data includes a line 604 specifying a language and password. The textual data includes a line 606 commanding execution of another script. The textual data includes a line 608 including a request for data from a web server including an SQL statement "UNION ALL select NULL". The line 610 indicates a command to execute another script. The line 612 includes a command to execute a script 612. The line 614 includes an SQL statement. The line 616 indicates a request to access a URL. The textual data in the dataset may be used in generation of a signature representing a detected event.

Figure 7A:
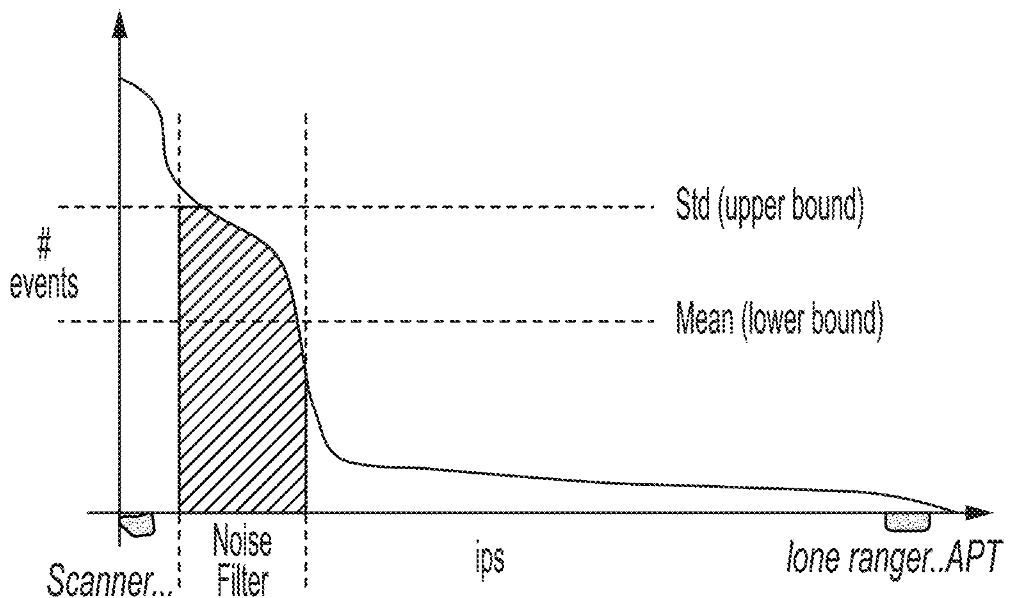
FIG. 7A is a diagram indicating setting of thresholds for filtering out events from consideration by a CGR system, in accordance with some embodiments of the technology described herein.

FIG. 7A is a diagram indicating setting of thresholds for filtering out events from consideration by a CGR system (e.g., CGR system 120 described herein with reference to FIG. 1A), in accordance with some embodiments of the technology described herein. The diagram shows a plot of a number of detected events vs. IP addresses. As shown in FIG. 7A, the diagram shows a lower bound (e.g., a mean number of events) and an upper bound (e.g., a standard deviation away from the mean). For IP addresses with a number of detected events within the lower and upper bound, the CGR system may generate a filter that removes traffic to/from the IP addresses for consideration in event detection. For example, these IP addresses may be determined to not present a risk to a software application. The CGR system may further generate rule(s) to perform actions with respect to IP addresses outside of the range. For example, IP addresses with a number of detected events greater than the upper bound may indicate an attack from a scammer. The CGR system may configure a computer network and security system to block communications from those IP addresses.

Figure 7B:
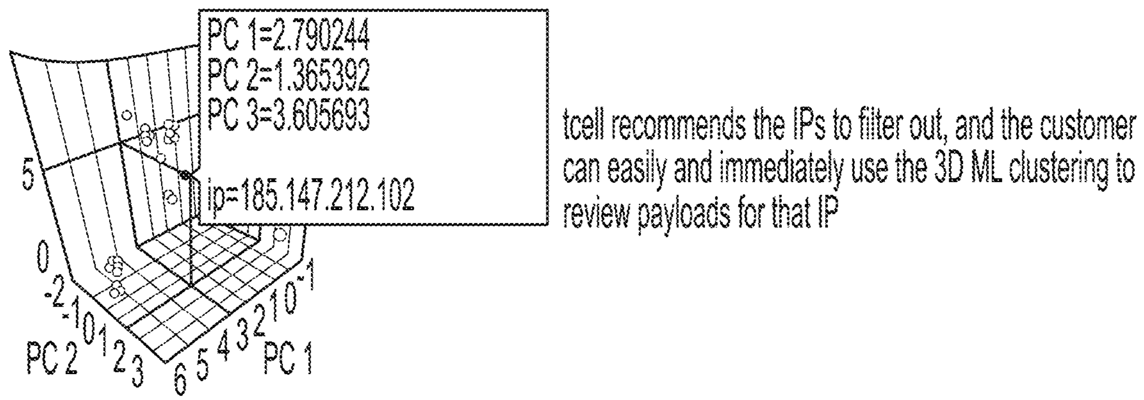
FIG. 7B is a diagram illustrating a recommendation made by the CGR system to filter and/or block certain types of network communications, in accordance with some embodiments of the technology described herein.

FIG. 7B is a diagram illustrating a recommendation made by the CGR system of FIG. 7A to filter and/or block certain types of network communications, in accordance with some embodiments of the technology described herein. As shown in FIG. 7B, the recommendation includes a list of IP addresses to filter from consideration for event detection. If accepted by a user, communications from the IP addresses would not be processed by a computer network and security system to detect events (e.g., potential attacks). As illustrated in the example of FIG. 7B, the CGR system may allow a user to indicate a different selection for each of the IP addresses. For example, the user may determine to filter the IP address 52.33.1.07 but note the IP address 54.71.138.87.

Figure 8:
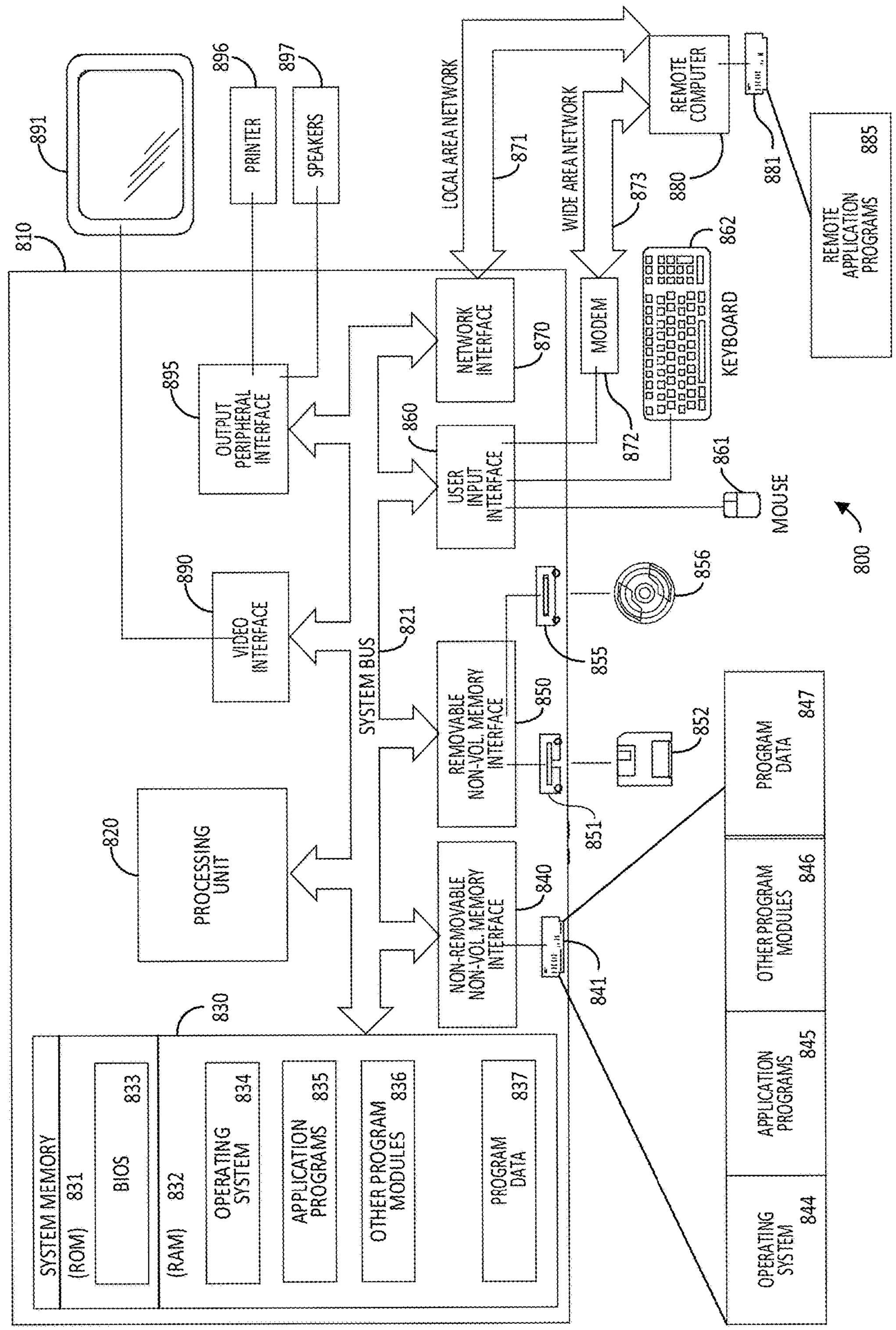
FIG. 8 shows a block diagram of an exemplary computing device, in accordance with some embodiments of the technology described herein.

FIG. 8 shows a block diagram of an exemplary computing device, in accordance with some embodiments of the technology described herein. The computing system environment 800 is only one example of a suitable computing environment and is not intended to suggest any limitation as to the scope of use or functionality of the technology described herein.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the technology described herein includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile or nonvolatile computer storage media. By way of example only, FIG. 8 illustrates a hard disk drive 841 that reads from or writes to non-removable, nonvolatile magnetic media, a flash drive 851 that reads from or writes to a removable, nonvolatile memory 852 such as flash memory, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media described above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. An actor may enter commands and information into the computer 810 through input devices such as a keyboard 862 and pointing device 861, commonly referred to as a mouse, trackball, or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device, or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets, and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the actor input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art. Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, a tablet computer, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. A computer-readable storage medium includes any computer memory configured to store software, for example, the memory of any computing device such as a smart phone, a laptop, a desktop, a rack-mounted computer, or a server (e.g., a server storing software distributed by downloading over a network, such as an app store)). As used herein, the term "computer-readable storage medium" encompasses only a non-transitory computer-readable medium that can be considered to be a manufacture (i.e., article of manufacture) or a machine. Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion among a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIG. 2. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for monitoring network traffic in a cloud computing environment, the system comprising:

at least a first computing device comprising a first set of one or more processors configured to execute a computer network security system, the computer network security system configured to perform:

detecting a plurality of events in the cloud computing environment, generating a plurality of datasets containing information about at least some of the detected plurality of events, and providing the plurality of datasets to a configuration generation and recommendation (CGR) system; and at least a second computing device comprising a second set of one or more processors configured to execute the CGR system, the CGR system configured to perform:

obtaining the plurality of datasets from the computer network security system;

generating, using at least one trained ML model, a plurality of signatures representing the plurality of events, the generating comprising processing the plurality of datasets using the at least one trained ML model to obtain the plurality of signatures;

clustering the plurality of signatures to obtain signature clusters representing clusters of events in the plurality of events;

identifying a particular event cluster from among the clusters of events; and updating the configuration of the computer network security system based on characteristics of events in the identified particular event cluster.

2. The system of claim 1, wherein the computer network security system comprises a network traffic monitoring module comprising a plurality of event detection agents, wherein different event detection agents are configured to detect events of different types, and wherein events of different types correspond to network communications of different types of attacks on one or more software applications executing in the cloud computing environment.

3. The system of claim 1, wherein the computer network security system comprises a firewall.

4. The system of claim 3, wherein the firewall comprises a web application firewall (WAF) configured to monitor network traffic from and to one or more software applications executing in the cloud computing environment.

5. The system of claim 1, wherein the computer network security system is further configured to perform:

identifying the at least some of the detected plurality of events, wherein the identifying comprises identifying events, from among the detected plurality of events, which present a security risk.

6. The system of claim 1, wherein an event in the plurality of events may comprise one or more network communications of: a cross-site scripting (XSS) attack, a cross-site forgery attack, an HTTP redirect attack, a clickjacking attack, an XML external entity (XXE) attack, an account takeover (ATO) attack, a structured query language (SQL) injection attack, an operating system (OS) command injection attack, and/or a local file inclusion (LFI) attack.

7. The system of claim 1, wherein the computer network security system and the CGR system execute in a common cloud computing environment.

8. The system of claim 1, wherein the computer network security system and the CGR system execute in different cloud computing environments.

9. A method for monitoring network traffic in a cloud computing environment using a computer network security system, the method comprising:

using at least one computer hardware processor to perform:

detecting a plurality of events in the cloud computing environment, generating a plurality of datasets containing information about at least some of the detected plurality of events;

generating, using at least one trained ML model, a plurality of signatures representing the plurality of events, the generating comprising processing the plurality of datasets using the at least one trained ML model to obtain the plurality of signatures;

clustering the plurality of signatures to obtain signature clusters representing clusters of events in the plurality of events;

identifying a particular event cluster from among the clusters of events; and updating a configuration of the computer network security system based on characteristics of events in the identified particular event cluster.

10. The method of claim 9, wherein the computer network security system comprises a network traffic monitoring module comprising a plurality of event detection agents, wherein detecting the plurality of events comprises using different event detection agents to detect events of different types, and wherein events of different types correspond to network communications of different types of attacks on one or more software applications executing in the cloud computing environment.

11. The method of claim 9, wherein the method further comprises:

monitoring network traffic from and to one or more software applications executing in the cloud computing environment.

12. The method of claim 9, wherein the method further comprises:

identifying the at least some of the detected plurality of events, wherein the identifying comprises identifying events, from among the detected plurality of events, which present a security risk.

13. The method of claim 9, wherein an event in the plurality of events may comprise one or more network communications of: a cross-site scripting (XSS) attack, a cross-site forgery attack, an HTTP redirect attack, a clickjacking attack, an XML external entity (XXE) attack, an account takeover (ATO) attack, a structured query language (SQL) injection attack, an operating system (OS) command injection attack, and/or a local file inclusion (LFI) attack.

14. The method of claim 9, wherein updating the configuration of the computer network security system, comprises:

generating, based on characteristics of events in the identified particular event cluster, one or more rules for processing events detected by the computer network security system in the cloud computing environment; and updating the configuration of the computer network security system with the generated one or more rules.

15. The method of claim 9, wherein the at least one trained ML model comprises a first trained ML model;

wherein the plurality of datasets comprises a first dataset comprising information about a first event in the plurality of events;

wherein generating the plurality of signatures comprises generating a first signature for the first event in the plurality of events; and wherein generating the first signature comprises:

generating an initial numeric representation of the first dataset; and providing the initial numeric representation as input to the first trained ML model to obtain the first signature, wherein the first signature is a lower-dimensional numeric representation than the initial numeric representation.

16. The method of claim 15, wherein the first trained ML model is an autoencoder.

17. The method of claim 9, wherein the plurality of events comprises a first event corresponding to a first type of attack, and a second event corresponding to a second type of attack different from the first type of attack;

wherein the at least one trained ML model comprises a first ML model for processing datasets for events corresponding to the first type of attack, and a second ML model for processing datasets for events corresponding to the second type of attack; and generating the plurality of signatures comprises generating a first signature corresponding to the first event using the first ML model, and generating a second signature corresponding to the second event using the second ML model.

18. The method of claim 17, wherein the plurality of datasets comprises a first dataset comprising information about the first event and a second dataset comprising information about the second event;

wherein generating plurality of signatures comprises:

generating a first initial numeric representation of the first dataset using a character embedding model, and providing the first initial numeric representation as input to the first ML model to obtain the first signature; and generating a second initial numeric representation of the second dataset using the character embedding model, and providing the second initial numeric representation as input to the second ML model to obtain the second signature.

19. The method of claim 9, further comprising:

monitoring network traffic from and to one or more software applications executing in the cloud computing environment using the computer network security system with the updated configuration.

20. At least one non-transitory computer-readable storage medium storing processor executable instructions that, when executed by at least one computer hardware processor cause the at least one computer hardware processor to perform a method for monitoring network traffic in a cloud computing environment using a computer network security system, the method comprising:

detecting a plurality of events in the cloud computing environment, generating a plurality of datasets containing information about at least some of the detected plurality of events;

generating, using at least one trained ML model, a plurality of signatures representing the plurality of events, the generating comprising processing the plurality of datasets using the at least one trained ML model to obtain the plurality of signatures;

clustering the plurality of signatures to obtain signature clusters representing clusters of events in the plurality of events;

identifying a particular event cluster from among the clusters of events; and updating a configuration of the computer network security system based on characteristics of events in the identified particular event cluster.

* * * * *